United States Patent
Rune et al.

(10) Patent No.: US 9,521,650 B2
(45) Date of Patent: Dec. 13, 2016

(54) UE WAKE-UP AHEAD OF PAGING OCCASIONS TO RETRIEVE PAGING CONFIGURATION INFORMATION WHEN IN (LONG) DRX

(75) Inventors: Johan Rune, Lindingö (SE); Erik Eriksson, Linköping (SE); Joachim Sachs, Stockholm (SE)

(73) Assignee: Optis Cellular Technology, LLC, Plano, TX (US)

( * ) Notice: Subject to any disclaimer, the term of this patent is extended or adjusted under 35 U.S.C. 154(b) by 171 days.

(21) Appl. No.: 14/390,970

(22) PCT Filed: Apr. 5, 2012

(86) PCT No.: PCT/EP2012/056261
§ 371 (c)(1),
(2), (4) Date: Feb. 9, 2015

(87) PCT Pub. No.: WO2013/149666
PCT Pub. Date: Oct. 10, 2013

(65) Prior Publication Data
US 2015/0173039 A1    Jun. 18, 2015

(51) Int. Cl.
*H04W 68/02* (2009.01)
*H04W 52/02* (2009.01)
*H04W 88/06* (2009.01)

(52) U.S. Cl.
CPC ......... *H04W 68/02* (2013.01); *H04W 52/0216* (2013.01); *H04W 52/0229* (2013.01); *H04W 52/0232* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2009/0310503 A1* | 12/2009 | Tenny | H04W 68/00 370/252 |
| 2011/0002281 A1* | 1/2011 | Terry | H04W 52/0216 370/329 |

(Continued)

FOREIGN PATENT DOCUMENTS

EP    1986458 A1    10/2008

OTHER PUBLICATIONS

ISA/EP, International Search Report and Written Opinion for PCT/EP2012/056261 dated Sep. 6, 2012.

(Continued)

*Primary Examiner* — Brian Roberts

(57) ABSTRACT

In transmission of paging information from a mobile network to a terminal device (200), the terminal device applies a discontinuous reception cycle to enter a sleep mode. Further, the terminal device determines an advance wakeup time (AW) for leaving the sleep mode. The advance wakeup time (AW) is advanced by an advancement time interval (ΔA) with respect to a start of an active time of the discontinuous reception cycle. At the determined advance wakeup time (AW), the terminal device leaves the sleep mode and starts monitoring the downlink control channel with respect to paging configuration information transmitted by the mobile network. The paging configuration information defines a paging occasion for transmission of the paging information. On the basis of the paging configuration information, the terminal device monitors the paging occasion to receive the paging information from the mobile network.

30 Claims, 10 Drawing Sheets

(56) References Cited

U.S. PATENT DOCUMENTS

2011/0294491 A1* 12/2011 Fong ............... H04L 5/001
                                                    455/422.1
2012/0300655 A1* 11/2012 Lee ............... H04W 24/00
                                                    370/252

OTHER PUBLICATIONS

Alcatel-Lucent, "Interaction of DRX and Downlink HARQ in LTE," 3GPP Draft; R2-071661, 3GPP TSG RAN WG2 Meeting #58, Kobe, Japan, May 7-11, 2007.
Anonymous, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.5.0, Mar. 12, 2012.

* cited by examiner

UE WAKE-UP AHEAD OF PAGING OCCASIONS TO RETRIEVE PAGING CONFIGURATION INFORMATION WHEN IN (LONG) DRX

TECHNICAL FIELD

The present invention relates to methods for transmitting paging information and to corresponding devices.

BACKGROUND

In mobile networks, such as a 3GPP (Third Generation Partnership Project) mobile network, various types of terminal devices may be used. For example, Machine Type Communication (MTC) terminal devices may be used in addition to conventional types of terminal devices, in the following also termed as user equipment (UE), such as mobile phones, smartphones, data modems, mobile computers, or the like. MTC terminal devices typically transmit and receive only small amounts of data, which may occur more or less infrequently, e.g., once per week to once per minute. MTC terminal devices may also be polled for data, resulting in an irregular pattern of data transmission. MTC terminal devices are typically assumed to be autonomous sensor devices, alarm devices, actuator devices, remote control devices, or the like, which communicate with application servers, rather than being used for communication by a human user. Hence, this type of communication may also be referred to as machine-to-machine (M2M) communication and the devices may be denoted machine devices (MDs). An application server may in turn configure the MTC terminal device and receive data from them. The application server may be within or outside the mobile network.

Considering the above, MTC terminal devices are typically characterized by a modest bit rate and sparse communication. MTC terminal devices may therefore be implemented with low-performance data transmission capabilities. Further, MTC devices typically need to be very energy efficient, since external power supplies may not be available and/or it may be practically or economically not feasible to frequently replace or recharge their batteries.

A known way of energy saving in a UE, which may also be applied to MTC devices, is to use Discontinuous Reception (DRX). By means of DRX, a UE can enter an energy efficient sleep mode when no data transmission is needed. In the sleep mode, receiver circuitry of the UE may be turned off. DRX can be applied in connected mode, but also in idle mode, in which the UE only receives paging information on certain paging occasions. The latter scenario may also be referred to as paging DRX or idle DRX. Paging information can be signaling to a terminal device to initiate a connection to a base station. Paging, i.e., the transmission of paging information, can be a process used by the mobile network to contact a terminal device which has no connection or association to a base station and whose location is known with an accuracy that may be less than a single cell.

According to 3GPP Technical Specification 36.304 V10.5.0, the paging DRX cycle is defined by paging configuration information, through parameters T and nB. The parameter T is defined as the minimum of the "defaultPagingCycle" Information Element (IE), transmitted to the UE by the mobile network, and a possible preconfigured UE specific DRX cycle length. The parameter nB is transmitted by the mobile network to the UE together with the "defaultPagingCycle" IE. The paging DRX cycle is divided into a sleep period and an active time, also referred to as active period. The active time essentially is equal to a paging occasion defined by the paging configuration information.

If a MTC terminal device, or other type of UE, has entered a new cell during the sleep period, it may first need to retrieve new paging configuration information before it is ready to receive paging information in the new cell. Otherwise the MTC terminal device or UE may fail to receive paging information transmitted at the beginning of the DRX active time or may even completely fail to receive the paging information transmitted at a certain paging occasion. This may become particularly significant if a long paging DRX cycle, e.g., with sleep periods of several minutes, hours or even longer is used. Long DRX sleep periods typically imply a greater probability of waking up in a new cell. Further, a missed paging occasion may result in a long delay in the order of another DRX sleep period until the next possibility of receiving the paging information. Similar problems may also occur if there is no cell change because the paging configuration may change also in within the same cell.

Accordingly, there is a need for efficiently transmitting paging information to terminal devices which apply DRX for receiving the paging information.

SUMMARY

According to an embodiment of the invention, a method for transmission of paging information from a mobile network to a terminal device is provided. According to the method, the terminal device enters a sleep mode according to a discontinuous reception cycle. In the sleep mode the terminal device is not monitoring a downlink control channel transmitted by the mobile network. Further, the terminal device determines an advance wakeup time for leaving the sleep mode. The advance wakeup time is advanced by an advancement time interval with respect to a start of an active time of the discontinuous reception cycle. At the determined advance wakeup time, the terminal device leaves the sleep mode and starts monitoring the downlink control channel with respect to paging configuration information from the mobile network. The paging configuration information defines a paging occasion for the transmission of the paging information. On the basis of the paging configuration information, the terminal device monitors the paging occasion to receive the paging information from the mobile network.

According to a further embodiment of the invention, a method for transmission of paging information from a mobile network to a terminal device is provided. The terminal device is configured to enter, according to a discontinuous reception cycle, a sleep mode in which the terminal device is not monitoring a downlink control channel transmitted by the mobile network. According to the method, the network node determines an advancement time interval defining an advance wakeup time for the terminal device leaving the sleep mode. The advance wakeup time is advanced by the advancement time interval with respect to a start of an active time of the discontinuous reception cycle. Further, the network node controlling the transmission of the paging information on the basis of the determined advancement time interval.

According to a further embodiment, a terminal device is provided. The terminal device comprises a radio interface for data transmission between a mobile network and the terminal device. Further, the terminal device comprises a processor. The processor is configured to control the terminal device to enter, according to a discontinuous reception cycle, a sleep mode in which the terminal device is not monitoring a downlink control channel transmitted by the mobile network. Further, the processor is configured to determine an advance wakeup time for leaving the sleep mode. The advance wakeup time being advanced by an advancement time interval with respect to a start of an active time according to the discontinuous reception cycle. Further, the processor is configured to control the terminal device to leave the sleep mode at the determined advance wakeup time and start monitoring the downlink control channel with respect to paging configuration information from the mobile network. The paging configuration information defines paging occasion for transmission of the paging information. Further, the processor is configured to control the terminal device to monitor, on the basis of the paging configuration information, the paging occasion to receive the paging information.

According to a further embodiment of the invention, a network node is provided. The network node comprises an interface for controlling data transmission between a mobile network and a terminal device. The terminal device is configured to enter, according to a discontinuous reception cycle, a sleep mode in which the terminal device is not monitoring a downlink control channel transmitted by the mobile network. Further, the network node comprises a processor. The processor is configured to determine an advancement time interval defining an advance wakeup time for the terminal device leaving the sleep mode. The advance wakeup time is advanced by the advancement time interval with respect to a start of an active time of the discontinuous reception cycle. Further, the processor is configured to control the transmission of the paging information on the basis of the determined advancement time interval.

DETAILED DESCRIPTION OF EMBODIMENTS

In the following, the invention will be explained in more detail by referring to exemplary embodiments and to the accompanying drawings. The illustrated embodiments relate to concepts involving transmission of paging information between a base station of a mobile network and a terminal device.

Figure 1:
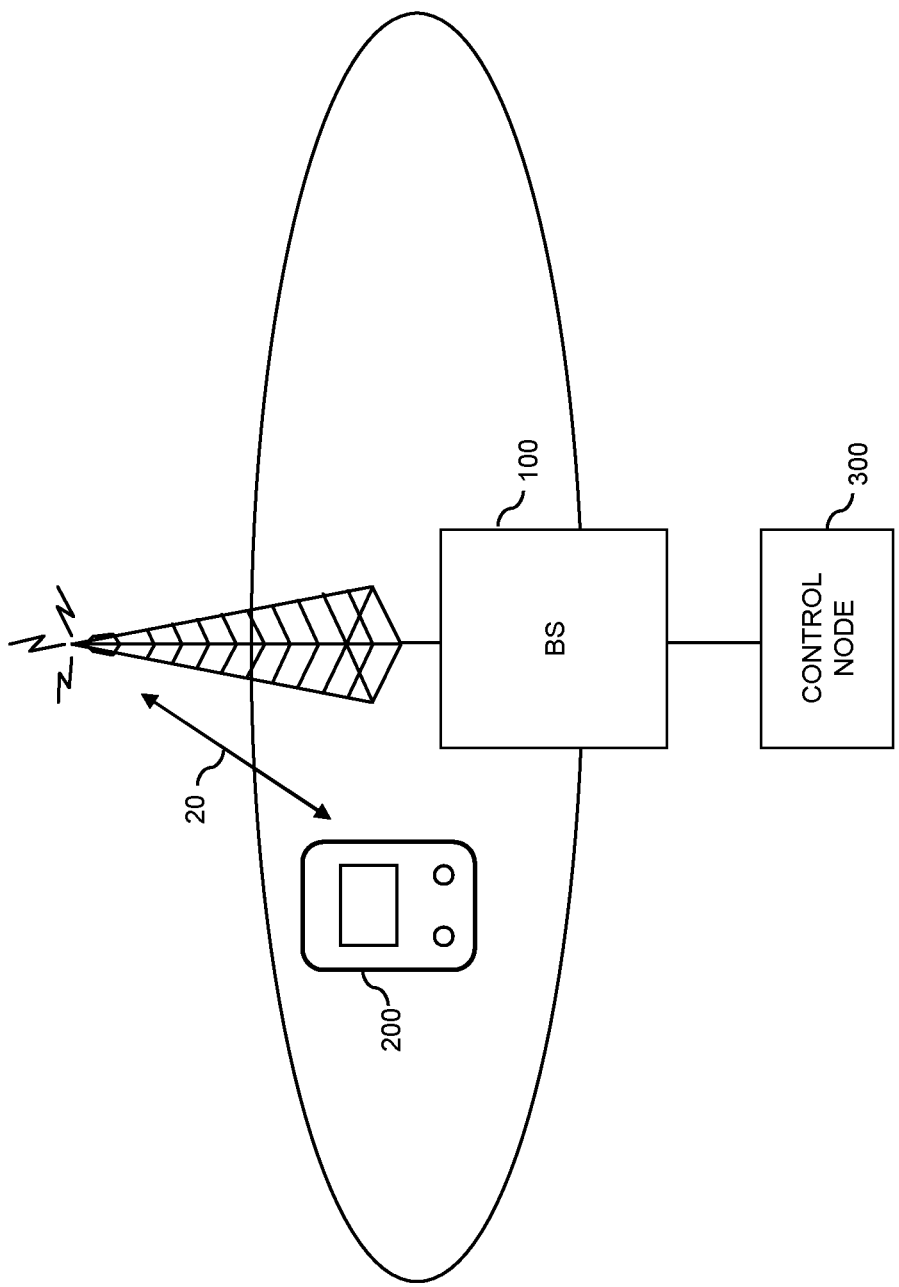
FIG. 1 schematically illustrates a mobile network environment in which concepts according to embodiments of the invention can be applied.

FIG. 1 schematically illustrates a mobile network environment, i.e., infrastructure of a mobile network, represented by a base station (BS) 100 and a control node 300, as well as a terminal device 200 which may connect to the mobile network for data transmission, e.g., for reception of data from the BS 100 and/or for sending of data to the BS 100, as illustrated by arrow 20. Further, the terminal device 200 may also receive paging information from the mobile network, which may also occur in idle mode. In idle mode the terminal device 200 does not have an association, e.g., Radio Resource Control (RRC) connection, to the BS 100 and the location of the terminal device 200 is known to the network with the accuracy of an area which may be covered by multiple cells. In contrast, in connected mode the terminal device 200 has an association, e.g., an RRC connection, to the BS 100 and the mobile network knows in which cell the terminal device 200 is located.

The mobile network may be implemented according to the 3GPP Evolved Packet System (EPS) technical specifications. In this case, the radio access network part of the mobile network is often referred to as Long Term Evolution (LTE) radio access network. In such an LTE scenario, the BS 100 may be an Evolved Universal Terrestrial Radio Access Network (E-UTRAN) Node B (eNB), and the control node 300 may be a Mobility Management Entity (MME). If the mobile network is implemented as a Universal Mobile Telecommunications System (UMTS) network, optionally implementing High Speed Packet Access (HSPA), the BS 100 may be a Node B (NB), and the control node 300 may be a Radio Network Controller (RNC). In such examples, the paging information is transmitted from the mobile network to the terminal device using a Paging Channel (PCH).

According to concepts as described herein, the terminal device 200 may use DRX for receiving the paging information, i.e., enter and leave a sleep mode on the basis of a DRX cycle implicitly defined through paging configuration. The paging configuration information defines a paging configuration to be used for transmission of paging information to the terminal device 200. In particular, the paging configuration information defines one or more time slots, referred to as paging occasions, for the transmission of the paging information. Using DRX in the above way in connection with the reception of paging information may also be referred to as paging DRX or idle mode DRX. An active time of the DRX cycle is in this case defined by a time interval in which the terminal device 200 expects a paging occasion, as defined by the latest paging configuration information received from the mobile network. In the sleep mode, the terminal device 200 is not monitoring certain channels transmitted by the mobile network, in particular a downlink control channel such as a Physical Downlink Control Channel (PDCCH) in 3GPP LTE. In the sleep mode, the terminal device may also stop monitoring a paging channel (PCH) for transmitting the paging information. In the sleep mode, the terminal device 200 may deactivate receiver circuitry to save energy.

Figure 2:
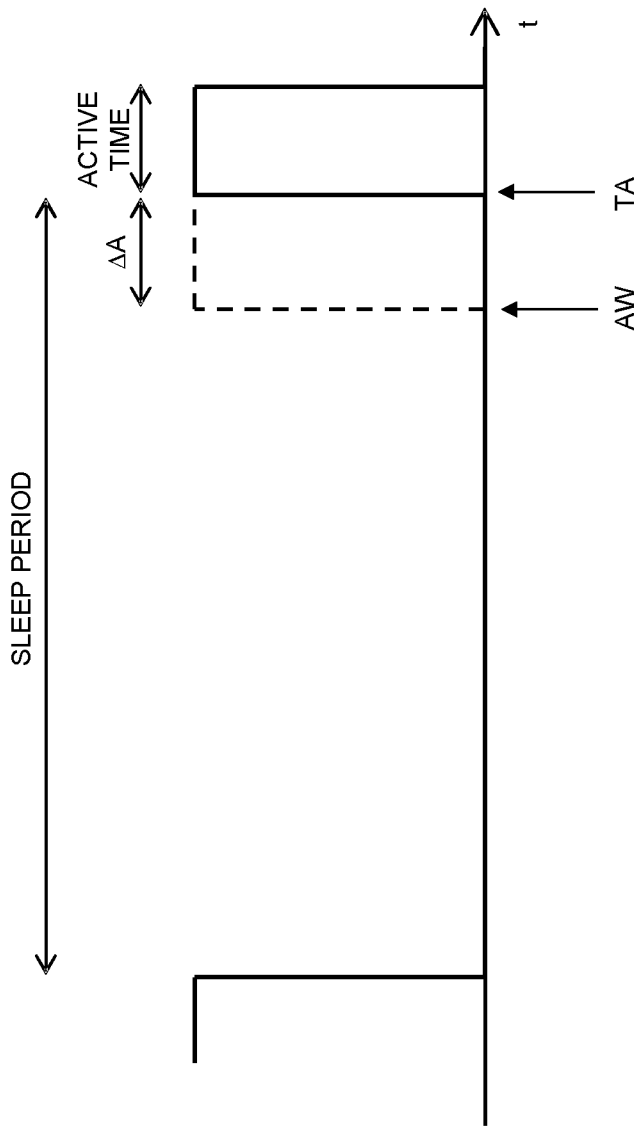
FIG. 2 shows an exemplary scenario of advanced wakeup from a DRX sleep period according to an embodiment of the invention.

As illustrated in FIG. 2, the DRX cycle includes a sleep period and an active time. During the sleep period SP, the terminal device 200 is in the sleep mode. During the active time the terminal device 200 is not in the sleep mode and may therefore monitor the downlink control channel and/or the PCH. In FIG. 2, the start of the active time is indicated by TA.

According to the concepts as described herein, the terminal device 200 determines an advance wakeup time AW for leaving the sleep mode before the start TA of the active time. As illustrated in FIG. 2, the advance wakeup time AW is advanced with respect to the start of the active time TA by an advancement time interval ΔA. At the advance wakeup time AW, the terminal device 200 leaves the sleep mode for monitoring the downlink control channel with respect to paging configuration information. In particular, the monitoring of the downlink control channel may be used to determine whether there was a change of the paging configuration information and/or to receive new paging configuration information. The terminal device 200 may then monitor the paging occasion defined by the paging configuration information to receive the paging information. By the advancement time interval, it can ensured that there is sufficient time for the terminal device 200 to check for, retrieve, and apply new paging configuration information before the next paging occasion. Accordingly, it can be avoided that the terminal device 200 misses the paging occasion due to a change in the paging configuration information.

Figure 3:
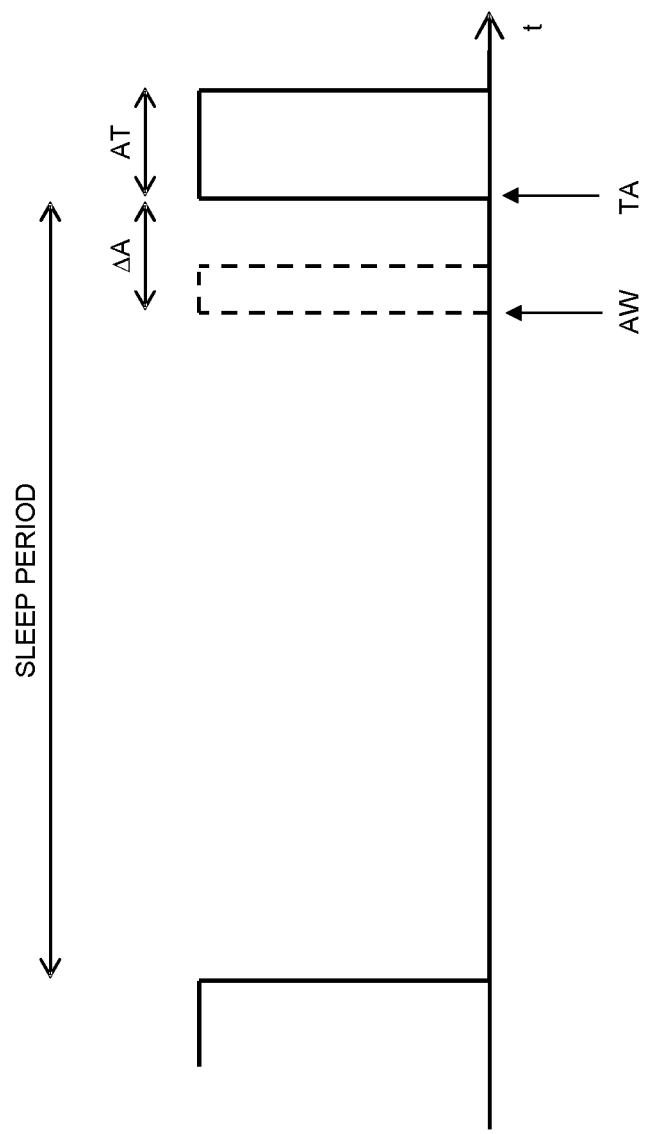
FIG. 3 shows a further exemplary scenario of advanced wakeup from a DRX sleep period according to an embodiment of the invention.

In the scenario as illustrated in FIG. 2, the terminal device 200 leaves the sleep mode already before the start TA of the active time of the DRX cycle and does not re-enter the sleep mode before the start TA of the active time. The terminal device 200 therefore does not need to leave the sleep mode at the start TA of the active time. However, after leaving the sleep mode at the advance wakeup time and receiving the paging configuration information, the terminal device 200 may also re-enter the sleep mode and then again leave the sleep mode at the start TA of the active time, as illustrated in FIG. 3.

The above concepts allow for reliably obtaining paging configuration information which may have changed during the sleep period of the DRX cycle, e.g., due to the terminal device 200 moving to a new cell or within the same cell. This is beneficial specifically when considering long DRX cycles, e.g., extended DRX cycles with sleep periods of several minutes or hours or even longer. In such cases, the relation of the advancement time interval to the overall sleep period is typically small so that there is no significant impact on energy saving potential through DRX.

The advancement time interval ΔA is determined by the terminal device 200. For this purpose, the terminal device 200 may also receive various inputs from the mobile network. In some scenarios, the advancement time interval ΔA may be determined by a node of the mobile network, e.g., the BS 100 or the control node 300, and then be indicated to the terminal device 200. In such scenarios, the terminal device 200 may determine the advancement time interval ΔA on the basis of the indication received from the network.

For determining a suitable value of the advancement time interval ΔA, various considerations may be applied. For example, steps needed by the terminal device 200 to acquire the paging configuration information may be considered, e.g., a number of the steps and/or a timing of the steps. For example, in order to acquire the entire paging configuration information in a new cell, the terminal device 200 may need to perform a number of steps involving acquisition of various types of information, e.g., accessing the new cell, preparing for reception of higher layer transmissions, and receiving of the actual paging configuration information. The times needed for performing such steps may vary, e.g., depending on configuration of the cell or other circumstances. Further, when assuming that paging occasions are defined in relation to a System Frame Number (SFN) cycle as for example used in 3GPP LTE, differences in paging configuration information and SFN cycle timing may cause significant variability in the locations of the paging occasions. A result of this variability is that the required minimum advancement time interval ΔA may be subject to considerable variation. The detailed variation may however be unknown beforehand. Accordingly, for determining the advancement time interval ΔA information acquired in previous cells visited by the terminal device 200 may be used and/or statistical methods may be applied. Also various probability values may be considered, e.g., a probability of a cell change during the sleep mode, e.g., on the basis of an indication of a velocity at which the terminal device 200 is moving or other mobility indications, a probability of a change in the paging configuration information in the same cell or between different cells, and/or a probability of missing a paging occasion.

Determining a suitable value of the advancement time interval ΔA may involve a trade-off between, on the one hand, a probability of being able to acquire the paging configuration soon enough and, on the other hand, a risk of wastefully shortening the sleep period of the DRX cycle and thereby limiting energy saving possibilities. In some scenarios, this trade-off may also be addressed by determining the advancement time interval ΔA generously, e.g., on the basis of a worst-case scenario, and allowing the terminal device 200 to re-enter the sleep mode after receiving the paging configuration information, e.g., if there is sufficient time until the start TA of the active time or until the first possible paging occasion. An example of such a scenario is illustrated in FIG. 3. A worst-case scenario could for example assume a maximum value from a given range of possible values of a certain unknown contribution to the time needed to retrieve the paging configuration information.

Accordingly, in the concepts as described herein the terminal device 200 leaves the sleep mode before the start of the active time of the DRX cycle, at the advance wakeup time AW, and starts monitoring the downlink control channel with respect to paging configuration information. Further, the concepts may involve processes for determining a suitable value of the advancement time interval ΔA, e.g., by utilizing historical data such as statistics related to channel quality and/or cell changes, previously acquired paging configuration information, previously acquired information on the SFN cycle timing, information on previous lengths of the sleep period. Further, a probability of waking up in a new cell or probability of missing a paging occasion may be considered, e.g., in terms of a probability threshold. Also strategic considerations may be involved, e.g., how much to rely on previously obtained paging configuration information or on previously obtained SFN cycle timing.

In some scenarios, one or more mobility indications may be used to estimate the probability that the terminal device 200 has moved to a new cell and/or to a new Multicast-Broadcast Single Frequency Network (MBSFN) area during the sleep period, and this probability may be used when determining a suitable value of the advancement time interval ΔA. For example, if the probability of having moved to a new cell or MBSFN area is low, a shorter advancement time interval ΔA may be sufficient.

Further, it may be taken into account that if the paging configuration information has changed, the paging occasion(s) in the next active time will typically not occur exactly one DRX cycle length, or a multiple of DRX cycle lengths, after the paging occasion(s) in the DRX cycle in which the previous paging occasion(s) occurred. Hence, variations in the paging configuration information may cause a jitter in the time position of the paging occasion(s). For compensating such jitter, the jitter may be estimated and the advancement time interval ΔA may be increased in accordance with the estimated jitter.

If the paging occasions are defined in relation to the SFN cycle, additional jitter in the location of the paging occasion(s) may be caused by the SFN cycle being unsynchronized between different cells. This may for example be the case if the cells do not belong to a common MBSFN area. For compensating such jitter, the jitter of the SFN cycle timing may be estimated and the advancement time interval ΔA may be increased in accordance with the estimated jitter of the SFN cycle timing.

In the following exemplary procedures for determining a suitable value of the advancement time interval ΔA when assuming a cell change during the sleep period are further explained. In these processes, the following contributions may be considered: the contribution of time needed to acquire the paging configuration information, the contribution of potential differences in the paging configuration between different cells, and/or the contribution of moving between cells with unsynchronized timing of paging occasions.

In the following, the contribution of time needed to acquire the paging configuration information is addressed in the context of the above-mentioned LTE scenario. However, it is do be understood that similar considerations may also be applied with respect to other types of radio access technology.

In 3GPP LTE, the paging configuration information is transmitted in System Information, specifically in a System Information Block (SIB) referred to as SIB2. The SIB2 is transmitted within a periodically reoccurring time window. The length and periodicity of this time window are configurable and defined in a further SIB, referred to as SIB1. The length of the time window is configurable between 1 ms and 40 ms and the periodicity may range from 8 to 512 radio frames, corresponding to 80-5120 ms.

To obtain the paging configuration information in the new cell, the terminal device 200 may first need to retrieve a Master Information Block (MIB), which is repeated in subframe #0 of each radio frame, i.e., every 10 ms, on the Broadcast Control Channel (BCCH). Then the terminal device 200 may retrieve the SIB1 which is transmitted on the Physical Downlink Shared Channel (PD-SCH) five subframes, i.e., 5 ms, after every second repetition of the MIB. Then the terminal device 200 may retrieve the SIB2, which contains the actual paging configuration information, according to scheduling information in the SIB1 and as indicated by a System Information Radio Network Temporary Identity (SI-RNTI) on the PDCCH. In some cases, e.g., depending on reception quality, repeated receptions of the same SI may be needed to ensure successful acquisition of the paging configuration information.

The following times contribute to the time needed for acquiring the paging configuration information: a first delay from leaving the sleep mode to next transmission of the MIB between 0 ms and 10 ms, a second delay between transmission of the MIB and next transmission of the SIB1 of either 5 ms or 15 ms, and a third delay between transmission of the SIB1 and the SIB2 corresponding to the sum of the periodicity of transmitting the SIB2, ranging between 80 ms and 5120 ms, and the length of the time window for transmitting the SIB2, ranging between 1 ms and 40 ms. Assuming the maximum values for the above delays and that a single reception of the MIB, SIB1, and SIB2 is sufficient to acquire the paging configuration information this gives a total time of 10 ms (for the first delay)+15 ms (for the second delay)+5160 ms (for the third delay)=5185 ms. When rather assuming that two receptions of the MIB, SIB1, and SIB2 are needed to acquire the paging configuration information the first delay increases by 10 ms to 20 ms (due to the repetition of the MIB every 10 ms), the second delay increases by 20 ms to 35 ms (due to the repetition of the SIB1 after every second repetition of the MIB, i.e., every 20 ms), and the third delay increases to by 5120 ms to 10280 ms (due to the assumed maximum periodicity of transmitting the SIB 2), resulting in a time of 10335 ms.

In addition, the terminal device 200 may need time to perform measurements on one or more carrier frequencies, e.g., as indicated by cell reselection configuration information in the previous cell, in order to find the new cell. Such measurements may involve acquiring frequency and symbol synchronization, acquiring frame timing synchronization, and determining the physical cell identity. In some scenarios, these steps can be performed within a time interval corresponding to the duration of one radio frame, i.e., in the order of 10 ms, but this is typically more time may be needed. If the terminal device 200 already performed measurements on the cell within the last 5 s, a typical value may be in the order of 100 ms. If the terminal device did not perform measurements on the cell within the last 5 s, the required time may be much longer, depending on the signal quality, e.g., in terms of Signal to Interference and Noise Ratio (SINR), and the number of cells from which the terminal device 200 simultaneously receives signals. To determine the time the terminal device 200 needs to perform measurements on the new cell, on which it did not perform measurements within the last 5 s, a uniform probability distribution in the time interval of 0-5 s may be assumed, which is a rather conservative model in which the value of 5 s represents the worst case. However, more sophisticated probability distributions may be assumed in order to achieve a more realistic assessment.

After the above initial steps, the terminal device 200 may proceed to measure the signal quality, e.g., on the basis of Reference Signal Received Power (RSRP) measurements. Here, a RSRP measurement may be performed in a single measurement period. The duration of such measurement period may be implementation dependent. In some cases, the terminal device may also perform averaging over multiple measurement periods, e.g., to fully utilize the available measurement window of 200 ms if performed in connected mode. In accordance with simulations on typical implementations, a duration of about 66 ms can be assumed for the measurement period. In some scenarios, the terminal device 200 can perform the above initial steps and the measurements of signal quality for several cells simultaneously on the same carrier. However, if multiple carriers have to be covered, e.g., because no acceptable cell was found on the carrier with highest priority, the procedures may need to be repeated for each carrier.

As can be seen from the above, estimating the required time for a cell reselection procedure may involve various considerations. If the terminal device 200 has performed cell measurements within the last 5 s, it may be assumed that it is still located in one of the measured cells and that the synchronization procedures can be performed in about 100 ms. In the absence of such recent cell measurements within the last 5 s, a reasonable value in the interval ranging from 100 ms to 5 s may be determined. For this purpose, a probability distribution may be assumed, e.g., with uniform probability within the interval from 0-5 s. For the measurements of signal quality, e.g., RSRP measurements, a measurement period with a length of up to 200 ms can be assumed, e.g., 66 ms as suggested above. In some scenarios, if the previous neighbor cell information indicated neighbor cells on multiple carriers, it may also be taken into account that synchronization and measurements on several carriers may be needed.

In some cases, if the hardware of the terminal device 200 requires an implementation-dependent stabilization time during the wakeup procedure, this may be taken into account as well when determining the advancement time interval ΔA.

In the following, the contribution of potential differences in the paging configuration between different cells and of unsynchronized paging occasions in different cells is addressed in the context of the above-mentioned LTE scenario. However, it is do be understood that similar considerations may also be applied with respect to other types of radio access technology.

In 3GPP LTE, an SFN is associated with every radio frame. The length of a radio frame is 10 ms, and the radio frame and consists of 10 subframes, each having a length of 1 ms. The SFN wraps around every 10.24 seconds, i.e., every 1024 frames, which is may be referred to as an SFN cycle. More specifically, the SFN parameter in the MIB consists of eight bits. The transmission time of the MIB provides another two "bits", yielding an SFN defined by ten bits, i.e., ranging from 0 to 1023. The MIB is transmitted with a 40 ms schedule with repetitions every 10 ms. During the four transmissions of the MIB within a 40 ms period the SFN parameter in the MIB is fixed. Hence, the granularity of the SFN parameter in the MIB is 40 ms, whereas the MIB repetition number signifies the additional two bits. The MIB repetition number is not explicitly indicated, but may to be derived from receiving several MIB transmissions and detecting when the SFN parameter in the MIB changes between two MIB transmissions.

Typically, the above length of the SFN cycle is too short to serve as the basis for long DRX cycles. Therefore, a system-wide clock may be used to define the DRX cycles. The system-wide clock may be synchronized between different BSs. By using the system-wide clock, the DRX cycle can be extended to span multiple SFN cycles. Alternatively, the DRX cycle may also be defined on the basis of multiples of the SFN cycle.

From the system-wide clock or an alternative timing reference spanning multiple SFNs, the mobile network may determine an SFN cycle within which the paging information is transmitted to the terminal device 200. The paging occasions within this SFN cycle may then be defined by the paging configuration information, e.g., defined through parameters referred to as T and nB, e.g., as specified in 3GPP Technical Specification 36.304 V10.5.0. The system-wide clock or alternative timing reference would typically not be propagated to the terminal device 200. Hence, from the perspective of the terminal device 200 the DRX cycle spanning multiple SFN cycles is specified with the granularity of one SFN cycle, i.e., as multiples of 10.24 seconds. The same restriction, i.e., a granularity of one SFN cycle, would also be applied for defining the DRX cycle in the mobile network.

Figure 4:
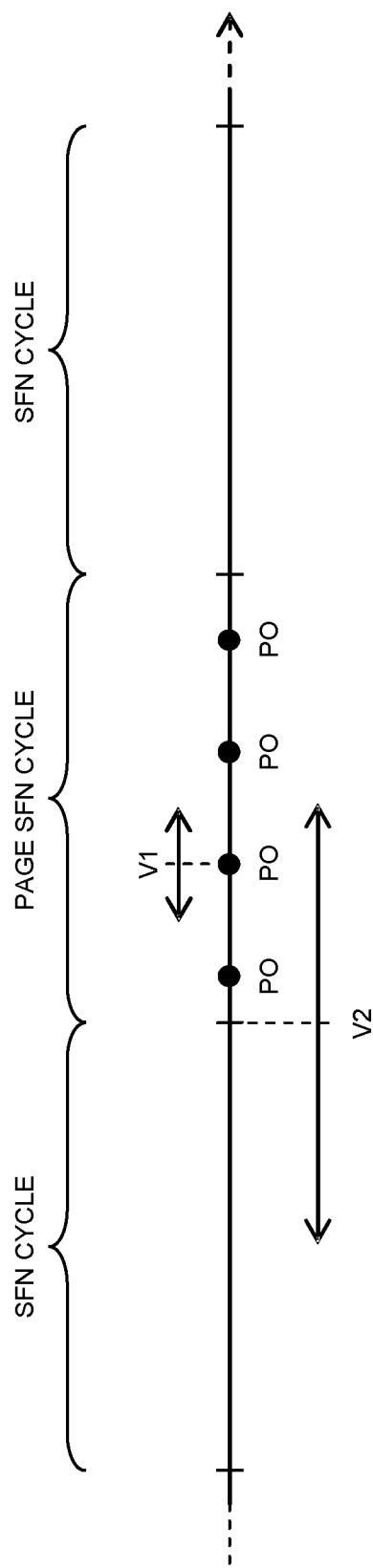
FIG. 4 schematically illustrates possible variations of paging occasions which may be considered in procedures according to an embodiment of the invention.

For example, as illustrated in FIG. 4, if the DRX cycle is configured to have a length of N SFN cycles, the paging information may be transmitted to the terminal device 200 in every $N^{th}$ SFN cycle, which may be denoted as "page SFN cycle", and the paging configuration information will then define in which radio frame(s) and subframes within the page SFN cycle paging information may be transmitted to the terminal device 200, i.e., the paging occasions PO.

As long as the terminal device 200 remains within the same cell, the SFN cycles will be consistent and the paging configuration indicated by the paging configuration information may remain static. In such cases, the time between corresponding paging occasions PO in two consecutive DRX cycles would be exactly N SFN cycles. However, when moving to a new cell, the paging configuration information, e.g., the parameters T and nB, may have changed, resulting in a shift of the paging occasions PO. Accordingly, a cell change may be associated with a variability V1 in the timing of the paging occasions within the page SFN cycle. When assuming that in 3GPP LTE differences in the parameters T and nB may shift the paging occasion PO by no more than 256 radio frames minus one subframe, i.e., 2.56 s, the variability V1 may be up to 2.56 s. However, if for example larger differences in the parameter T are possible, the shift the paging occasion PO and associated variability V1 may be larger, e.g., 10 s or more. For taking into account such variability, the advancement time interval ΔA may be determined to ensure that the terminal device 200 can receive paging information in the first subframe of the first radio frame of the page SFN cycle. This can be achieved by increasing the advancement time interval ΔA by up to 2.56 s. Depending on when the first paging occasion occurred according to the previous paging configuration information, a smaller increase may be sufficient. In some scenarios, a probability whether the paging configuration information in the new cell has changed as compared to the previous cell can be determined. If this probability is low, e.g., below a probability threshold, it can be assumed that the paging configuration information in the new cell is the same as in the previous cell. For example, such a probability could be determined from a validity scope of the paging configuration information. In such cases, it may be refrained from increasing of the advancement time interval ΔA due to the variability caused by possible changes in the paging configuration information.

In some scenarios, different cells may have unsynchronized SFN cycles, e.g., in terms of which "phase" of the SFN cycle in different cells matches a certain system-wide time. This may for example occur if the cells belong to different MBSFN areas. Accordingly, the terminal device 200 may wake up in a phase of the SFN cycle which is different from what would be expected from the SFN cycle of the previous cell in which the terminal device 200 entered the sleep mode. In the example of FIG. 4, the resulting variability due to different SFN cycle timing is illustrated as V2. Given that the length of the SFN cycle is 10.24 s, a value of about 5 s, i.e., about half of the length of the SFN cycle, can be assumed for the maximum phase difference between the SFN cycles in different cells. Other values could be used as well, e.g., as specified by accuracy requirements. For taking into account such variability, the advancement time interval ΔA may be determined to ensure that the terminal device 200 can receive paging information in the first subframe of the first radio frame of the page SFN cycle. This can be achieved by increasing the advancement time interval ΔA correspondingly, e.g., by about 5 s. If the maximum phase difference between the SFN cycles in different cells the can be even larger, the terminal device 200 may also increase the advancement time interval ΔA by up to a full SFN cycle.

As can be seen, the terminal device 200 may need to retrieve the paging configuration information already by about half the length of the SFN cycle plus 2.56 s, i.e., by about 7.68 s, before the first paging occasion would occur according to the SFN cycle and paging configuration information that was valid in the previous cell when the terminal device 200 entered the sleep mode. Hence, this time may be added to the advancement time interval A. If the previous cell and the new cell belong to the same MBSFN area an increase of up to 2.56 s may be sufficient.

It should be noted that the above value as given for the variability of the paging occasion due to a change in the paging configuration information are based on assuming that the parameters T and nB are derived from the paging configuration information and used to calculate the positions of multiple paging occasions within the page SFN cycle. When other parameters, or values of the parameter T greater than 2.56 s, are used, this may result in a different value of the variability. For example, for long DRX cycles only a single paging occasion in the page SFN cycle could be provided, and a single parameter could be used to specify the position of this single paging occasion within the page SFN cycle. In such a case, the variability of the position of the paging occasion within the page SFN cycle might by up to the full length of the SFN cycle, i.e., 10.24 s.

In view of the above contributions, the advancement time interval ΔA under poor circumstances may need to be 23 s or even larger. However, in typical situations a shorter advancement time interval ΔA is sufficient. It is therefore beneficial if the terminal device 200 may also use a shorter advancement time interval ΔA, e.g., in the order of 1-5 s. For selecting such a shorter advancement time interval ΔA, the terminal device 200 or a node of the mobile network, e.g., the BS 100 or the control node 300, may take into account information from cells previously visited by the terminal device 200, e.g., by assuming the same values of the periodicity of the SIB2 and SI window length as configured in the latest visited cell in the same PLMN. When selecting between a longer and a shorter advancement time interval ΔA, also apply a target probability of the terminal device 200 being able to monitor a paging occasion as configured in the present cell may be used. In other words, a target probability or acceptable risk that the paging configuration information is not acquired soon enough can be defined. The target probability or acceptable risk to use in this selection, e.g., in terms of a probability threshold, or the advancement time interval ΔA to use in different cases, may be configured in the terminal device 200, e.g., by a user or operator of the terminal device 200, by the mobile network, e.g., via SI, dedicated Radio Resource Control (RRC) signaling, Over-The-Air (OTA) USIM configuration, or Open Mobile Alliance Device Management (OMA DM), by a manufacturer of the terminal device 200, or by a provider of software executed by the terminal device 200.

In some scenarios, e.g., as illustrated in FIG. 3, the terminal device 200 may re-enter the sleep mode after retrieving the paging configuration information from the mobile network, and wake up at the start of the active time of the DRX cycle, i.e., at the next potential paging occasion as determined by the latest received paging configuration information. In this way, an excessive shortening of the sleep period by a long advancement time interval ΔA may be avoided and the terminal device 200 may use a longer advancement time interval ΔA than in scenarios in which the terminal device 200 does not return to the sleep mode, as illustrated in FIG. 2.

Accordingly, the advancement time interval ΔA, or at least the advancement time interval ΔA needed to address a worst case scenario, may constitute a significant part of the sleep period, unless the sleep period is significantly longer than 23 s. This may reduce the benefits of the early wakeup for obtaining the paging configuration information and also reduce the possible energy saving through DRX.

In view of the above, the terminal device 200 may use a relatively long advancement time interval ΔA, e.g., as needed to address the worst case scenario, and return to the sleep mode after acquiring the paging configuration information. The terminal device 200 may then again leave the sleep mode at the start TA of the active time of the DRX cycle, as for example illustrated in FIG. 3.

In some scenarios, the advancement time interval ΔA may be determined on the basis of assuming a similar situation as found in the previously visited cell, before entering the sleep mode. For example, synchronized SFN cycles, the same values of the periodicity for transmitting the SIB2 and SI window length, and/or the same required number of reception repetitions as needed retrieve the paging configuration information may be assumed. On the basis of these assumptions, the advancement time interval ΔA may be reduced as compared to the advancement time interval ΔA needed to address the worst case scenario. Also in this case, the terminal device 200 may return to the sleep mode after acquiring the paging configuration information until the next possible paging occasion or start TA of the active time of the DRX cycle.

In some cases, it may also be assumed that the terminal device 200 is still located in the same cell as during the previous active time of the DRX cycle and the advancement time interval ΔA may be determined accordingly.

Further, also mobility indications may be utilized determining the advancement time interval ΔA. Such a mobility indication may for example represent a velocity at which the terminal device 200 is moving or classify the terminal device 200 according to different mobility categories, e.g., low mobility and high mobility. In addition also historical mobility data generated on the basis of past mobility indications may be utilized.

An indication of the velocity at which the terminal device 200 is moving, could for example be obtained from a satellite positioning device, e.g., a Global Positioning System (GPS) receiver, accelerometers, estimations based on Doppler shift measurements or Timing Advance changes. On the basis of the indication of the velocity one or more probability values may be determined, e.g., representing the probability of the terminal device 200 entering a new cell during the sleep period, the probability of the terminal device 200 entering a new cell on which the terminal device 200 did not perform measurements during the past 5 s, the probability of the terminal device 200 entering a cell with another SFN cycle timing, e.g., when leaving an MBSFN area, the probability of waking up too late to receive the paging configuration information, which may be determined taking into account one or more of the aforementioned probabilities, and/or the probability of missing a paging occasion, which may be determined taking into account one or more of the aforementioned probabilities, optionally in conjunction with a probability that the paging configuration information in the new cell is different from the previously received paging configuration information. To determine such probabilities, sizes of cells or MBSFN areas may be taken into account. Information for approximating sizes of cells or MBSFN areas may be configured in a database, e.g., in the terminal device 200 or in the mobile network, may be derived by applying statistics, and/or may be derived from other information, e.g., SI parameters. The determined probability or probabilities may in turn be used to determine the advancement time interval ΔA, e.g., by comparison to target probabilities or probability thresholds.

In addition or as an alternative, statistics may be utilized for determining the advancement time interval ΔA, e.g., statistics on how often the terminal device 200 leaves the sleep mode in a new cell or MBSFN area, on how often the terminal device 200 leaves the sleep mode in a new cell on which the terminal device 200 did not perform measurements during the past 5 s, on how often the terminal device 200 moves to a cell with another SFN cycle timing, on how often the paging configuration information is different in a new cell or MBSFN area, and/or on how of the terminal device 200 previously missed a paging occasion. On the basis of such statistics one or more probability values may be calculated, e.g., representing the probability of the terminal device 200 entering a new cell during the sleep period, the probability of the terminal device 200 entering a new cell on which the terminal device 200 did not perform measurements during the past 5 s, or the probability of the terminal device 200 entering a cell with another SFN cycle timing, respectively. Other data, such as an indication that the terminal device 200 belongs to certain mobility category, e.g., high mobility and low mobility, or other indications of mobile or stationary character of the terminal device 200 may be utilized as well.

Accordingly, the terminal device 200 may decide to leave the sleep mode early, i.e., a certain time interval before the start of the active time of the DRX cycle, to obtain paging configuration information which may have changed due to a cell change. For determining this time interval, i.e., the advancement time interval ΔA, various inputs may be utilized by the terminal device 200 and/or by a node of the mobile network, e.g., the BS 100 or the control node 300. An example of such inputs are historical data, e.g., channel qualities measured in the past, number of receptions required in the past for obtaining the paging configuration information, statistics, e.g., on earlier cell changes of the terminal device 200 or on earlier changes of MBSFN areas or on how often the paging configuration is different in a new cell, and/or estimations of sizes of cells or MBSFN areas. A further example are SI parameters acquired in the past, e.g., SIB scheduling information, neighbor cell information, e.g., on carrier frequencies, and MBSFN information, e.g., as transmitted via the Multimedia Broadcast/Multicast Service (MBMS) Control Channel (MCCH). Further examples of such inputs is the length of the sleep period of the DRX cycle as defined by the latest received paging configuration information or lengths of the sleep periods in the past. Still further examples are probability thresholds, e.g., for the probability of the terminal device 200 entering a new cell during the sleep period, the probability of the terminal device 200 entering a new cell on which the terminal device 200 did not perform measurements during the past 5 s, the probability of the terminal device 200 entering a cell with another SFN cycle timing, the probability of waking up too late to retrieve the paging configuration information, and/or the probability of the terminal device 200 missing a paging occasion. Such probability thresholds may be configured by the mobile network and indicated to the terminal device 200, e.g., in the SI. For determining the advancement time interval ΔA, also strategic choices may be utilized by the terminal device 200 and/or by the node of the mobile network, such as whether to assume the same SIB scheduling in a new cell as in a previously visited cell or whether to assume the same MBSFN area as in a previously visited cell. Further, also past situations in which the terminal device 200 missed a paging occasion, e.g., due to a cell change or a change of SI parameters, may be taken into account.

As mentioned above, leaving the sleep mode early to retrieve paging configuration information may be useful not only if the terminal device 200 has entered a new cell but also if the paging configuration information changes in the current cell. In the following exemplary procedures for determining a suitable value of the advancement time interval ΔA when assuming a change of the paging configuration of the same cell during the sleep period are further explained. In the following, such processes are illustrated in the context of the above-mentioned LTE scenario. However, it is do be understood that similar considerations may also be applied with respect to other types of radio access technology.

In 3GPP LTE, the paging configuration information is indicated in the SI and changes of the SI may only take place at the boundaries of the SI modification periods. The SI modification period is indicated in the SI and may range from 64 to 4096 radio frames, i.e., 640-40960 ms. Further, an upper limit for a number of changes of the SI in a given time period is specified. In particular, the SI may not change more than 31 times during a three hour period. Planned changes of the SI may be periodically indicated during the entire preceding SI modification period. Within the SI modification period in which a change of the SI is performed, a value tag is incremented to indicate that a change has taken place. The value tag is common for all SIBs except the MIB, SIB1, SIB10, SIB11 and SIB12, and is included in the SIB1.

In view of the above, the terminal device 200 may wake up early from the sleep period in order to monitor the downlink control channel with respect to paging configuration information, in particular to check for possible changes of the paging configuration information. As compared to the above scenario involving a cell change, the terminal device 200 only needs to check whether there are changes in the SIB2. A procedure for such a check may be selected depending on the length of the sleep period of the DRX cycle.

If the length of the sleep period is longer than an SI modification period, but shorter than three hours, the terminal device 200 UE may first check whether the value tag in the SIB1 has changed. If the value tag has not changed, the terminal device 200 may conclude that there was no change of the paging configuration information. On the other hand, if the value tag in the SIB1 has changed, the terminal device 200 may proceed to check the SIB2 to find out whether the paging configuration information has changed.

If the length of the sleep period is longer than three hours, the value tag in the SIB1 may be less reliable. In this case, the terminal device 200 may retrieve the SIB2 to check whether the paging configuration information has changed.

When neglecting downtimes of the BS 100 of the cell, e.g., as caused by severe software or hardware failures, the SFN cycle timing may be assumed to be consistent within the cell.

As previously mentioned, the time scheduling of the SIB1 is fixed to subframe #5 of every second radio frame. The SIB1 is thus transmitted every 20 ms, which is much more frequent than the transmission of the SIB2. However, if the terminal device 200 retrieves the SIB 1 and finds that the value tag has changed, it still has to retrieve the SIB2. In order to take into account the latter possibility, the terminal device 200 determines the advancement time interval ΔA to be long enough to retrieve the SIB2 before the start TA of the active time. Accordingly, if the sleep period is longer than the SI modification period, the terminal device 200 may determine the advancement time interval ΔA to be long enough to retrieve the SIB2 before the start TA of the active time.

For retrieving the SIB2, the terminal device 200 may wake up in time for the start of the last SI window, in which the SIB2 may be transmitted, that in its entirety precedes the upcoming active time. For this purpose, the terminal device 200 may need a synchronization time margin before the start TA of the active time, which may be adapted to how accurate an internal clock of the terminal device 200 is during the sleep mode. This accuracy in turn determines how much the internal clock may slip out of synchronization with the BS 100. The synchronization time margin may also be used to compensate possible time differences created by changing propagation delays due to movements of the terminal device 200 in relation to the BS 100. If the internal clock has slipped too much, the terminal device 200 may need to acquire symbol synchronization before proceeding to receive SIB2, as explained above for the scenario involving a cell change. Otherwise the synchronization time margin may be much smaller.

In view of the above, different strategies may be adopted by the terminal device 200 or by a node of the mobile network, e.g., by the BS 100 or by the control node 300, for determining the advancement time interval ΔA. According to a first strategy, it is assumed that the scheduling of the SIB2, i.e., the length and periodicity of the SI window containing the SIB2, did not change. According to a second strategy, the possibility that the scheduling of the SIB2 has changed is taken into account. In some implementations, the terminal device 200 or the node of the mobile network may also select between the first strategy and the second strategy.

In the first strategy, the advancement time interval ΔA may be selected shorter than in the second strategy. In particular, in the first strategy a value of the advancement time interval ΔA corresponding to one SI window length plus the above time margin may be sufficient and selected when assuming that only a single reception of the SIB2 is needed. If it is assumed that two receptions of the SIB2 are needed, then a value of the advancement time interval ΔA corresponding to two SI window periods plus one SI window length plus the above synchronization time margin may be sufficient and selected.

In the second strategy, the terminal device 200 or the network node may assume the maximum SI window period, the maximum SI window length, and an unknown location of the SI window within the SI window period, and determine the advancement time interval ΔA in accordance with this worst case scenario. However, on the basis of probability tradeoffs as explained above for the scenario involving a cell change, also a shorter advancement time interval ΔA than needed to address the worst case scenario may be selected. After leaving the sleep mode at the advance wakeup time, the terminal device 200 may first retrieve the scheduling information of the SIB2 from the SIB1, and thereby reduce the uncertainty in when to receive the SIB2. For this purpose, additional time is needed so that the terminal device 200 can first retrieve the SIB1, similar to the above scenario involving a cell change. However, the terminal device 200 may compensate adverse effects on the effective length of the sleep period by returning to the sleep mode between retrieving the SIB1 and the start of the SI window containing the SIB2. Moreover, if the terminal device 200 has spent less than three hours in the sleep mode, the value tag in SIB1 is still valid, which means that the terminal device 200 can determine from the SIB1 only that the paging configuration information did not change, without retrieving the SIB2.

If the length of the sleep period is less than the SI modification period, the terminal device 200 or the network node may decide to not utilize the early wake up from the sleep mode and rather leave the sleep mode only at the start TA of the active time of the DRX cycle.

Accordingly, if the terminal device 200 has spent more than an entire SI modification period in the sleep mode, it may wake up before start TA of the active time in order to check for a potential change of the paging configuration information in the same cell. For determining a suitable value of the advancement time interval ΔA, the terminal device 200 or a network node, e.g., the BS 100 or the control node 300, may utilize various inputs. Examples of such inputs are historical data, e.g., channel qualities measured in the past or number of receptions required in the past for obtaining the paging configuration information. Further examples of such inputs are SI parameters acquired in the past, e.g., SIB scheduling information. Further examples of such inputs are the length of the sleep period in the DRX cycle as defined by the latest received paging configuration information or past lengths of the sleep period. Further examples of such inputs are probability thresholds, e.g., for the probability of missing a paging occasion due to no longer valid paging configuration information. For determining the advancement time interval ΔA, also strategic choices may be utilized, such as whether to assume the same SIB scheduling as before entering the sleep mode or whether to retrieve the value tag from the SIB1.

The terminal device 200 or the node of the mobile network may select between using a strategy which takes into account potential cell changes and a strategy that assumes that the terminal device 200 remains in the same cell. For determining which strategy should be selected, the terminal device 200 or the node of the mobile network may utilize indications or other data about mobility, and optionally cell sizes, which may be obtained as described above. Such indications or data may also be used in combination with the length of the sleep period and/or a threshold for the probability of a cell change.

In the above procedures, the terminal device 200 may re-enter the sleep mode between the different steps for receiving the paging configuration information, e.g., if the terminal device 200 determines, e.g., on the basis of obtained scheduling information, that no relevant information will be transmitted for a certain time interval. Such intervals may for example include the time between transmission of the MIB and transmission of the SIB1 or the time between transmission of the SIB1 and transmission of the SIB2.

In the above-described procedures, the terminal device 200 may determine the advancement time interval ΔA, e.g., by performing the above-mentioned determinations and decisions. Alternatively, a node of the mobile network, e.g., the BS 100 or the control node 300, may assist in determining the advancement time interval ΔA, e.g., by providing inputs to be used by the terminal device 200 in determining the advancement time interval ΔA. Further, a node of the mobile network, e.g., the BS 100 or the control node 300, may determine the advancement time interval ΔA, e.g., by performing the above-mentioned determinations and decisions, and indicate it to the terminal device 200.

Further, in some scenarios the mobile network may be aware of the advance wakeup time AW or the advancement time interval ΔA applied by the terminal device 200, and the mobile network may then utilize this information for efficient transmission of the paging information.

For example, a node of the mobile network which is controlling the transmission of the paging information, e.g., the BS 100 or the control node 300 in the above-mentioned LTE scenario, i.e., the eNB or MME, or the BS 100 or the control node 300 in the above-mentioned UMTS scenario, i.e., the NB or RNC, may be made aware of the advancement time interval ΔA or the advance wakeup time AW. The node may then decide to send paging information to the terminal device 200 already when the terminal device 200 has left the sleep mode before the active time of the DRX cycle. In scenarios, where the terminal device 200 returns to the sleep mode after receiving the paging configuration information or after checking for changes of the paging configuration information, or even between different steps for retrieving the paging configuration information, the node may further ensure that the paging information is sent while the terminal device 200 has not yet re-entered the sleep mode.

The node of the mobile network may choose to apply this early sending of the paging information selectively, e.g., depending on whether the paging configuration has changed or not. For example, if the paging configuration has changed, such that the paging occasion of the terminal device 200 has changed during the sleep period of the terminal device 200, the node may choose to not use the early sending of the paging information and rather send the paging information in the next active time of the DRX cycle. In this way, the terminal device 200 may be provided with sufficient time to acquire the new paging configuration information which corresponds to the changed paging configuration. If the paging configuration has not changed during the sleep period of the terminal device 200, the node may send the paging information early when the terminal device 200 leaves the sleep mode at the advance wakeup time AW.

The node may also select to send the paging information to the terminal device 200 at a time as given by the paging configuration information that was valid the last time when the terminal device 200 had a paging occasion or the last time when the terminal device 200 had a chance to receive the paging configuration information, e.g., at the last transmission of the SIB2, even if the new paging configuration information indicates a different time. This may be accomplished early when the terminal device 200 leaves the sleep mode at the advance wakeup time AW. Alternatively, the old paging configuration may be retained for sending initial paging information during the active time of the terminal device's DRX cycle or for sending paging information at the first paging occasion after the change of paging configuration. In the latter case, the terminal device 200 does not need to leave the sleep mode early at the advance wakeup time AW to retrieve the new paging configuration information, but can retrieve the new paging configuration information while or after monitoring the downlink control channel and/or PCH to receive the paging information.

When the paging configuration changed during the sleep period of the terminal device 200, the node may also decide to send the paging information early when the terminal device 200 leaves the sleep mode at the advance wakeup time AW at times corresponding to both the new and the previously valid paging. The node may decide to omit sending the paging information at the later of these two times, if at this time a response from the terminal device 200 to the first sent paging information was already received by the mobile network.

To make the node of the mobile network aware of the advancement time interval ΔA as determined by the terminal device 200, the terminal device 200 may send a corresponding indication to the node. For this purpose, RRC signalling could be used, e.g., at RRC connection establishment, RRC signaling conveying Non Access Stratum (NAS) messages such as a Tracking Area Update request or handover signalling, or using a dedicated RRC signaling procedure. In the embodiments where the node of the mobile network itself determines the advancement time interval ΔA the node of the mobile network does not need to receive the advancement time interval ΔA from the terminal device 200 in order to be aware of it.

In the above procedures, reception of the paging information by the terminal device 200 may trigger a communication event, e.g., the terminal device 200 sending data to the mobile network and/or the terminal device 200 receiving data from the mobile network. After such communication event, i.e., when all pending data are sent or received, the terminal device 200 may re-enter the sleep mode, even if the active time of the DRX cycle has not ended yet. If the communication event was triggered by sending the paging information early, i.e., before the start TA of the active time of the DRX cycle, and the communication event ends before the start TA of the active time, the terminal device 200 may also decide to skip this active time completely and return to the sleep mode, without leaving the sleep mode at the start TA of the next active time.

In some scenarios, one or more parameters as used in the above procedures, e.g., SI parameters or more specifically parameters of the paging configuration information or a parameter indicative of SFN cycle timing, may be associated with a validity scope. The validity scope may for example be defined in terms of an area in which the parameter is valid and/or a time period in which the parameter is valid. The area could for example be defined as a geographical area or as a part of the topology of the mobile network, e.g., a Tracking Area or MBSFN area. The time period could for example be defined by one or more DRX cycles, one or more SI modification periods, or one or more SFN cycles. The mobile network, e.g., the BS 100 or the control node 300, may indicate the validity scope to the terminal device 200, e.g., together with the corresponding parameter.

For example, the validity scope could indicate that one or more parameter, e.g., of the paging configuration information or of the scheduling of the SIB2, is valid in a larger area than the present cell, e.g., in the present Tracking Area or MBSFN area, in all cells controlled by the BS 100 or in one, multiple, or all neighboring cells, such as according to a neighbor cell list. When determining the advancement time interval ΔA, the paging configuration information or the scheduling of the SIB2 may then be used according to the indicated validity scope. From the validity scope, also a probability that the parameter is valid may be determined and compared to a probability threshold. In this way, it may be decided whether to use a given parameter the advancement time interval ΔA, e.g., when waking up in a new cell.

In some cases, the validity scope could also be indicated in a fuzzy manner, e.g., in terms of the probability that the parameter is valid in a certain area, e.g., in a neighbour cell, or time period, e.g., in the next DRX cycle(s), SI modification period(s), or SFN cycle(s). Further, a degree of similarity between the different areas or time periods could be indicated.

In some scenarios, it may occur that the terminal device 200 misses a paging occasion. Reasons for missing a paging occasion may for example be that the terminal device 200 decided not to wake up at the advance wakeup time AW, that the advancement time interval ΔA was too short, or that the terminal device 200 for some reason, e.g., poor channel quality, failed to receive relevant signaling information, e.g., PDCCH signaling, during the paging occasion. If the terminal device 200 determines that it missed a paging occasion, it may indicate this to the mobile network, e.g., to the BS 100 or to the control node 300. Depending on the implementation this may for example be accomplished via RRC signaling or via NAS signaling.

Upon receiving such an indication from the terminal device 200, the mobile network, e.g., the BS 100 or the control node 300, may send a retransmission of the paging information and/or use some available connection to the terminal device 200 to indicate whether or not paging information was sent during the missed paging occasion. Such connection to the terminal device 200 may for example have been established in conjunction with the indication of the missed paging occasion indication. Any pending data to be sent to the terminal device 200, unless it was discarded due to failed paging, may then be delivered to the terminal device 200, e.g., using a connection to the terminal device 200 established in conjunction with the indication of the missed paging occasion, or using a newly established connection to the terminal device 200.

Figure 5:
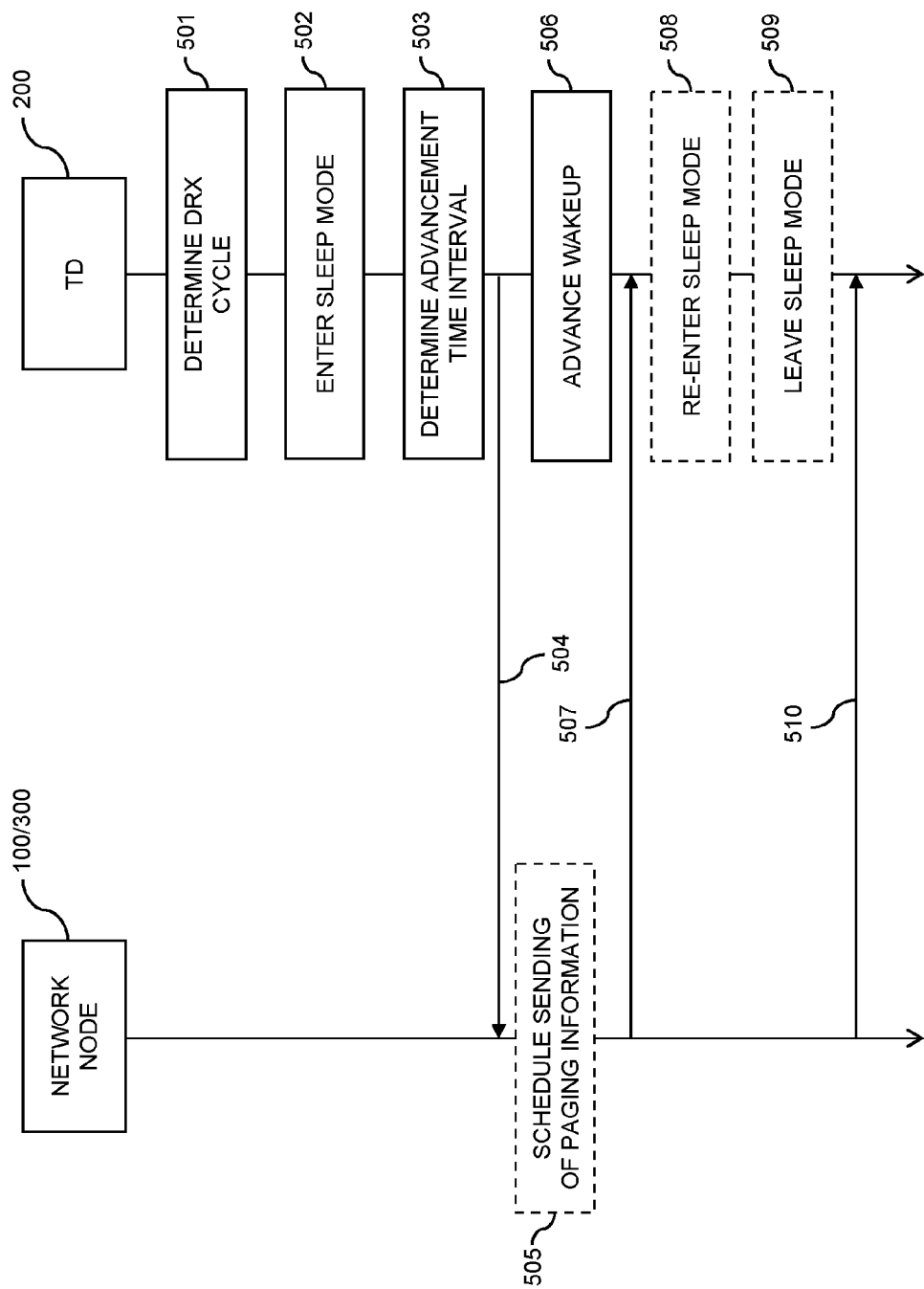
FIG. 5 shows exemplary procedures according to an embodiment of the invention.

FIG. 5 shows a timing diagram for illustrating exemplary procedures which are based on the above concepts. The procedures involve a network node, e.g., the BS 100 or the control node 300, and the terminal device (TD) 200. In these procedures, it is assumed that the terminal device 200 applies idle mode DRX or paging DRX to receive paging information from the mobile network.

At step 501, the terminal device 200 determines a DRX cycle. The DRX cycle is defined by the latest paging configuration information received by the terminal device 200. In particular, the active time of the DRX cycle may start at the beginning of the first paging occasion defined by the paging configuration information and end with the last paging occasion defined by the paging configuration information. In some scenarios, there may be only a single paging occasion per active time defined by the paging configuration. The latest paging configuration information may be received from the network node 100/300 or from some other network node, e.g., a network node which was serving the terminal device before a cell change.

At step 502, the terminal device 200 enters the sleep mode of the DRX cycle. In the sleep mode, the terminal device 200 is not monitoring the downlink control channel transmitted by the mobile network and is not monitoring the PCH transmitted by the mobile network. The terminal device 200 may therefore deactivate its receiver circuitry which is used for monitoring these channels and thereby save energy.

At step 503, the terminal device 200 determines the advancement time interval $\Delta A$. For this purpose, considerations and procedures as explained above may be applied by the terminal device 200. On the basis of the advancement time interval $\Delta A$, the terminal device 200 may then determine the advance wakeup time AW to be applied in the present DRX cycle. As indicated by message 504, the terminal device 200 may indicate the advancement time interval $\Delta A$ to the network node 100/300.

At step 505, the network node 100/300 may use the received indication of the advancement time interval $\Delta A$ to schedule the sending of the paging information to the terminal device 200. In particular, the network node 100/300 may decide whether or not it should make use of the above-mentioned option of sending the paging information early, before the active time of the DRX cycle. In FIG. 5 no such early transmission of paging information is indicated, i.e., it is assumed that this option is not used.

At step 506, the terminal device 200 performs an advance wakeup and leaves the sleep mode at the advance wakeup time AW. Accordingly, the terminal device 200 may start monitoring the downlink control channel with respect to paging configuration information. At step 506, the terminal device 200 may receive new paging configuration information, illustrated as being transmitted with message 507, or determine whether the paging configuration changed. In the latter case, if the terminal device 200 determines, e.g., based on a received indication, that the paging configuration has not changed, it may continue to use the already received paging configuration information and omit steps for newly receiving the paging configuration information.

At step 508, the terminal device 200 may optionally re-enter the sleep mode and leave the sleep mode again at the beginning of the active time of the DRX cycle, as illustrated by step 509. The re-entering of the sleep mode at step 508 may be performed selectively, e.g., depending on the available time until the next paging occasion.

The terminal device 200 may then monitor the paging occasion or paging occasions to receive the paging information, in FIG. 5 illustrated as being transmitted by message 510 from the network node 100/300.

Figure 6:
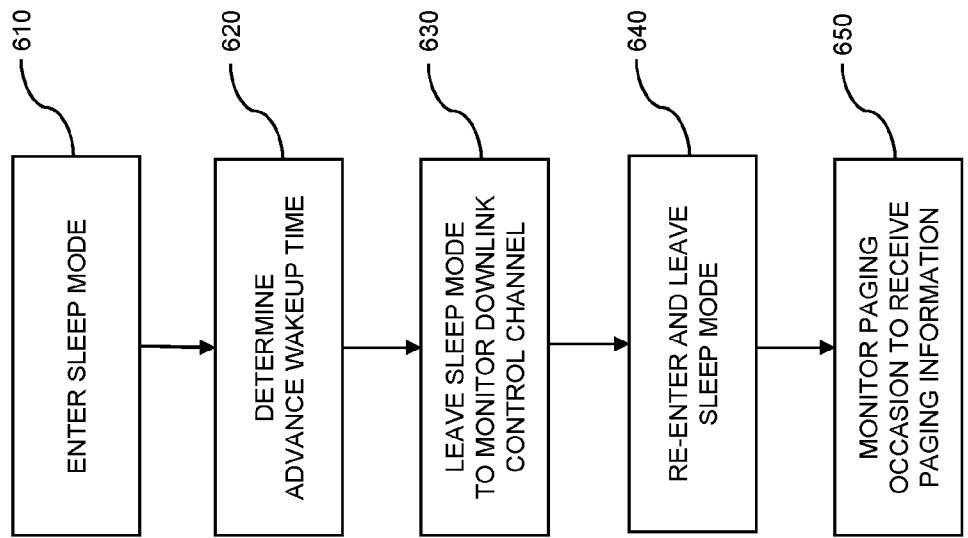
FIG. 6 shows a flowchart for illustrating a method according to an embodiment of the invention.

FIG. 6 shows a flowchart for illustrating a method for transmission of paging information from a mobile network to a terminal device. The method of FIG. 6 may be used for implementing the above-mentioned concepts in a terminal device, e.g., in the terminal device 200.

At step 610, the terminal device enters a sleep mode of a DRX cycle. In the sleep mode, the terminal device is not monitoring certain channels transmitted by the mobile network, in particular a downlink control channel and typically also a PCH. In the sleep mode the terminal device may thus deactivate of receiver circuitry used to monitor such channels and thereby save energy. The downlink control channel is used for providing paging configuration information to the terminal device. The paging configuration information defines a paging occasion for the transmission of paging information to the terminal device. In some scenarios, the paging configuration may further define one or more additional paging occasions which occur after the above-mentioned paging occasion. In other words, if the paging configuration information defines multiple paging occasions, the paging occasion referred to in the method of FIG. 6 is the temporally first among these paging occasions.

The DRX cycle applied by the terminal device for the reception of the paging information, which may also be referred to as a paging DRX cycle, is typically defined by the latest paging configuration information received by the terminal device. More specifically, an active time of the DRX cycle, in which the terminal device is not in the sleep mode, starts at the beginning paging occasion defined by this paging configuration information. The active time is a time period in which the terminal device monitors the downlink control channel and/or PCH for paging information. Further, during the active time the terminal device may also monitor other channels transmitted by the mobile network, e.g., other control channels. Accordingly, during the active time the receiver circuitry used to monitor such channels is activated. At the end of the active time, e.g., at the end of the paging occasion, or at the end of the last paging occasion, if multiple paging occasions are defined, the terminal device may enter the sleep mode. In some scenarios, the terminal device may also enter the sleep mode between such multiple paging occasions.

At step 620, the terminal device determines an advance wakeup time AW for leaving the sleep mode. The advance wakeup time is advanced by an advancement time interval $\Delta A$ with respect to the start of the active time of the DRX cycle, e.g., as illustrated in FIGS. 2 and 3.

At step 630, the terminal device leaves the sleep mode and starts monitoring the downlink control channel with respect to paging configuration information from the mobile network. This is accomplished at the advance wakeup time AW determined at step 630. This may involve receiving new paging configuration from the mobile network. Further, this may involve checking whether the paging configuration information changed as compared to the latest received paging configuration information. After monitoring the downlink control channel and retrieving new, or unchanged, paging configuration information or determining that the paging configuration has not changed at step 630, the terminal device may re-enter the sleep mode at step 640.

At step 650, the terminal device monitors the paging occasion defined by the paging configuration information to receive the paging information from the mobile network. If the terminal device re-entered the sleep mode after monitoring the downlink control channel and retrieving or checking for changes in the paging configuration information at step 630, step 640 may also involve leaving the sleep mode on the basis of the paging configuration information, i.e., according to the DRX cycle.

In step 620, various procedures may be used to determine the advancement time interval ΔA. For example, the terminal device may maintain historical data relating to past changes of the paging configuration information and determine the advancement time interval ΔA on the basis of the historical data. Such historical data may be based on or include SI parameters received in the past or data collected by the terminal device itself. In addition or as an alternative, the terminal device may determine the advancement time interval ΔA on the basis of a length of a sleep period between entering the sleep mode and start of the active time of the DRX cycle. In addition or as an alternative, the terminal device may also determine at least one probability value and determine the advancement time interval ΔA on the basis of the at least one determined probability value. Such probability value or values may for example represent a probability of the paging configuration information having changed while the terminal device was in the sleep mode, a probability of the terminal device having moved to another cell of the mobile network while the terminal device was in the sleep mode, and/or a probability of the terminal device failing to monitor the paging occasion. In some scenarios, the terminal device may receive such probability value(s) from the mobile network. In addition or as an alternative, the terminal device may determine the advancement time interval ΔA on the basis of a number of reception steps required by the terminal device to retrieve the paging configuration information. In some scenarios, the terminal device may receive an indication of the advancement time interval ΔA from the mobile network and may then determine the advancement time interval ΔA from this indication. Such indication could for example be received before entering the sleep mode at step 610.

In some scenarios, the terminal device may indicate the advancement time interval ΔA as determined at step 620 to the mobile network, e.g., to make a node of the mobile network aware of the advancement time interval ΔA.

In some scenarios, the terminal device may also receive the paging information before the start of the active period of the DRX cycle. For example, if the mobile network is aware of the advancement time interval ΔA and of the terminal device leaving the sleep mode at the advance wakeup time, it may decide to send the paging information early while the terminal device is not in the sleep mode.

In some scenario, the terminal device may also detect a failure in monitoring the paging occasion. For example, in may turn out that the monitored paging occasion does not correspond to the paging configuration currently applied by the mobile network for sending the paging information to the terminal device and that the terminal device missed a paging occasion defined by the currently valid paging configuration information. The terminal device may then indicate the failure to the mobile network. The network may then decide to send a retransmission of possibly missed paging information, thereby recovering the failure.

Figure 7:
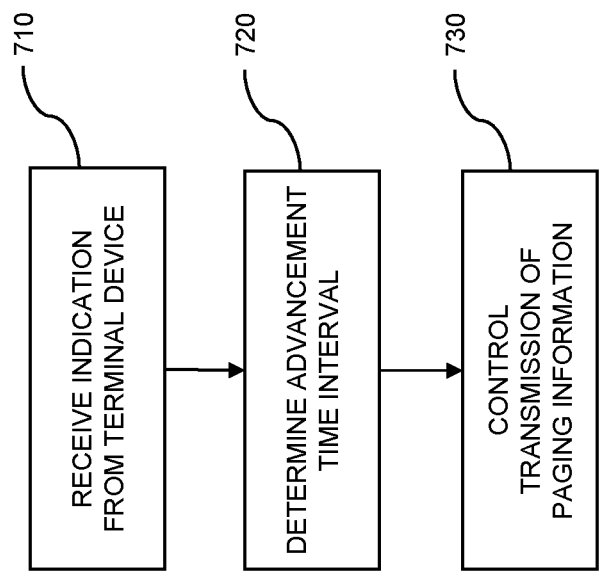
FIG. 7 shows a flowchart for illustrating a further method according to an embodiment of the invention.

FIG. 7 shows a flowchart for illustrating a method for transmission of paging information from a mobile network to a terminal device. The method may be used for implementing the above-mentioned concepts in a node of the mobile network, e.g., in the BS 100 or in the control node 300. In the method of FIG. 7, it is assumed that the terminal device is configured to apply a DRX cycle according to which it enters a sleep mode in which the terminal device is not monitoring a downlink control channel and/or PCH transmitted by the mobile network.

At step 710, the node may receive an indication from the terminal device. The indication may in particular indicate an advancement time interval ΔA defining an advance wakeup time AW for the terminal device leaving the sleep mode. The advance wakeup time AW is advanced by the advancement time interval ΔA with respect to a start of an active time of the DRX cycle.

At step 720, the node determines the advancement time interval ΔA. This may be accomplished on the basis of the indication as received at step 710. Alternatively, step 710 may be omitted and the node may perform one or more procedures for determining the advancement time interval ΔA. For example, the node may be aware of the area, e.g., in terms of cells, for which the paging configuration in the present cell of the terminal device is valid, or the node may be aware of the paging configuration in neighboring cells, or the node may maintain historical data relating to past changes of the paging configuration information and determine the advancement time interval ΔA on the basis of such knowledge of paging configuration validity, paging configuration in neighboring cells or historical data. Such historical data may be based on or include SI parameters transmitted to the terminal device or other data collected by the node or some other device, e.g., the terminal device. In addition or as an alternative, the node may determine the advancement time interval ΔA on the basis of a length of a sleep period between entering the sleep mode and start of the active time of the DRX cycle. In addition or as an alternative, the node may also determine at least one probability value and determine the advancement time interval ΔA on the basis of the at least one determined probability value. Such probability value or values may for example represent a probability of the paging configuration information having changed while the terminal device was in the sleep mode, a probability of the terminal device having moved to another cell of the mobile network while the terminal device was in the sleep mode, and/or a probability of the terminal device failing to monitor the paging occasion. In addition or as an alternative, the node may determine the advancement time interval ΔA on the basis of a number of reception steps required by the terminal device to retrieve the paging configuration information. Furthermore, as other examples, such a probability value or values may represent a probability of the terminal device 200 moving to a cell with another paging configuration based on the above mentioned possible knowledge of paging configuration validity or paging configuration in neighboring cells. In some scenarios, the network node may indicate such probability value(s) to the terminal device.

At step 730, the node controls the transmission of paging information to the terminal device. This may for example involve sending the advancement time interval ΔA as determined by the node using the procedures of step 720 to the terminal device. The terminal device may then use the advancement time interval ΔA for determining its advance wakeup time AW. This may also involve that the network node determines paging configuration information defining a paging occasion for sending the paging information to the terminal device and sends the paging configuration information to the terminal device. For this purpose, the network node may also send information on the downlink control channel, e.g., a downlink resource assignment for transmitting the paging configuration. The actual transmission of the paging configuration information may then be accomplished according to the downlink resource assignment, e.g., using the MIB, SIB1, and SIB2 as described above. This sending of the paging configuration information may be accomplished after the advance wakeup time AW, as defined by the advancement time interval ΔA, and before the start of the active time of the DRX cycle. This may also involve that the node performs sending of the paging information to the terminal device early, after the advance wakeup time AW and before the start of the active time of the DRX cycle.

In some scenarios, the node may receive from the terminal device an indication of a failure in monitoring the paging occasion by the terminal device. If the paging information was sent at this paging occasion, the node may send a retransmission of the paging information.

It is to be understood that the methods of FIGS. 6 and 7 may be combined to each other as appropriate. For example, the indication of the advancement time interval ΔA to the mobile network as optionally performed in the method of FIG. 6 could be received by the node in step 710 of FIG. 7 and be used as an input for the method of FIG. 7. Similarly, the indication of the advancement time interval ΔA to the terminal device as optionally performed in the method of FIG. 7 could be received by the terminal device before or in step 610 of FIG. 6 and be used as an input for the method of FIG. 6. Further, also the paging configuration information or paging information which are sent in the method of FIG. 7 may be received by the terminal device and form inputs of the method of FIG. 6.

Figure 8:
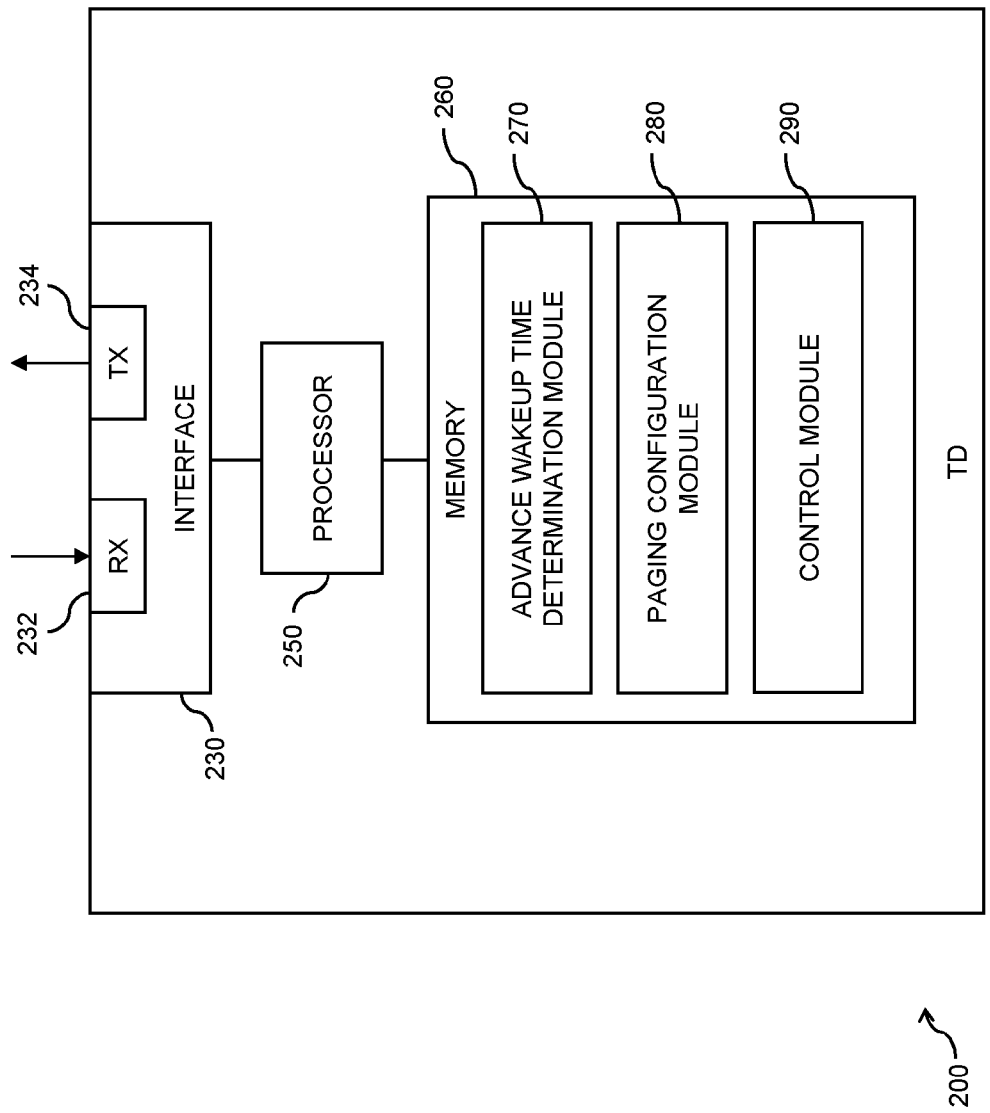
FIG. 8 schematically illustrates a terminal device according to an embodiment of the invention.

FIG. 8 schematically illustrates exemplary structures for implementing the above-described concepts in the terminal device 200.

In the illustrated structure, the terminal device 200 includes a radio interface 230 for performing data transmission to or from a mobile network, e.g., via the BS 100. In particular, the radio interface may be configured for monitoring the above-mentioned downlink control channel and the above-mentioned PCH. It is to be understood that for implementing transmitter (TX) functionalities the radio interface 230 includes one or more transmitters 234, and that for implementing receiver functionalities (RX) functionalities the radio interface 230 may include one or more receivers 232. In the above-mentioned LTE scenario, the radio interface 230 may correspond to the LTE-Uu interface of the E-UTRAN. In the above-mentioned UMTS scenario, the radio interface 230 may correspond to the Uu interface of the UMTS Terrestrial Radio Access Network (UTRAN).

Further, the terminal device 200 includes a processor 250 coupled to the radio interface 230 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities of the terminal device 200. More specifically, the memory 260 may include an advancement time interval determination module 270 for accomplishing the above-described determination of the advancement time interval ΔA. Further, the memory 260 may include a paging configuration module 280 for accomplishing the above-mentioned configuration of the terminal device 200 for monitoring the paging occasion, e.g., by acquiring paging configuration information. Further, the memory 290 may include a control module 290 for performing various control operations as mentioned above, e.g., the entering and leaving of the sleep mode.

It is to be understood that the structure as illustrated in FIG. 8 is merely schematic and that the terminal device 200 may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device or program code of one or more applications to be executed by the processor 250. According to some embodiments, also a computer program product may be provided for implementing concepts according to embodiments of the invention, e.g., a computer-readable medium storing the program code and/or other data to be stored in the memory 260.

Figure 9:
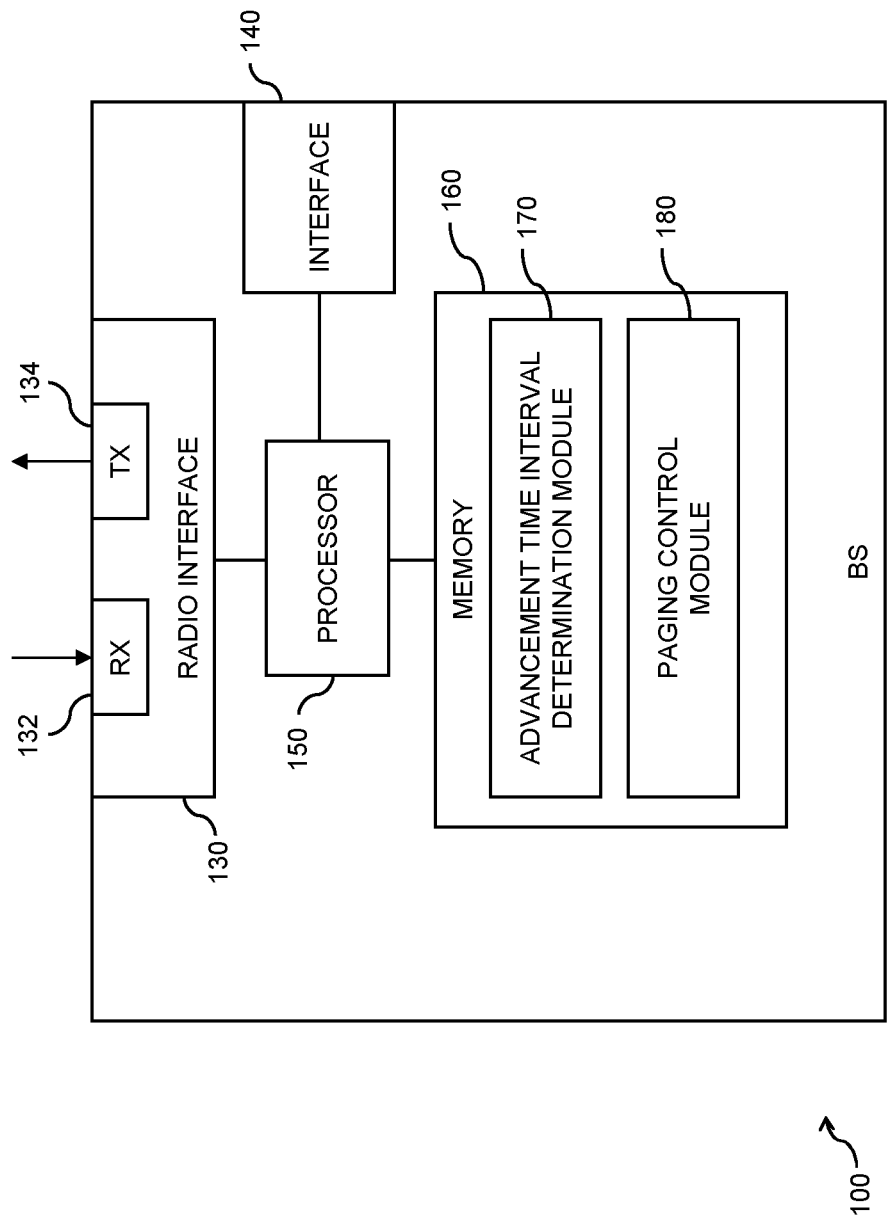
FIG. 9 schematically illustrates a base station according to an embodiment of the invention.

FIG. 9 schematically illustrates exemplary structures for implementing the above-described concepts in the BS 100.

In the illustrated structure, the BS 100 includes a radio interface 130 for data transmission to or from the terminal device 200. It is to be understood that for implementing transmitter (TX) functionalities the radio interface 130 may include one or more transmitters 134, and that for implementing receiver (RX) functionalities the radio interface 130 may include one or more receivers 132. The radio interface 130 may in particular be configured to transmit the above mentioned downlink control channel, i.e., serve for controlling data transmission to or from the terminal device 200, and the above-mentioned PCH. In the above-mentioned LTE scenario, the radio interface 130 may correspond to the LTE-Uu interface of the E-UTRAN. In the above-mentioned UMTS scenario, the radio interface 130 may correspond to the Uu interface of the UTRAN. Further, the BS 100 may include a control interface 140 for communicating with other nodes of the mobile network, e.g., the control node 300 of FIG. 1.

Further, the BS 100 includes a processor 150 coupled to the interfaces 130, 140 and a memory 160 coupled to the processor 150. The memory 160 may include a ROM, e.g., a flash ROM, a RAM, e.g., a DRAM or SRAM, a mass storage, e.g., a hard disk or solid state disk, or the like. The memory 160 includes suitably configured program code to be executed by the processor 150 so as to implement the above-described functionalities of the BS 100. More specifically, the memory 160 may include an advancement time interval determination module 170 for accomplishing the above-described determination of the advancement time interval. Further, the memory 160 may include a paging control module 180 for controlling the transmission of paging information to the terminal device 200, e.g., by determining and transmitting the paging configuration information to the terminal device 200 and/or by indicating the determined advancement time interval ΔA to the terminal device 200.

It is to be understood that the structure as illustrated in FIG. 9 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS, e.g., known functionalities of an eNB or NB. According to some embodiments, also a computer program product may be provided for implementing concepts according to embodiments of the invention, e.g., a computer-readable medium storing the program code and/or other data to be stored in the memory 160.

Figure 10:
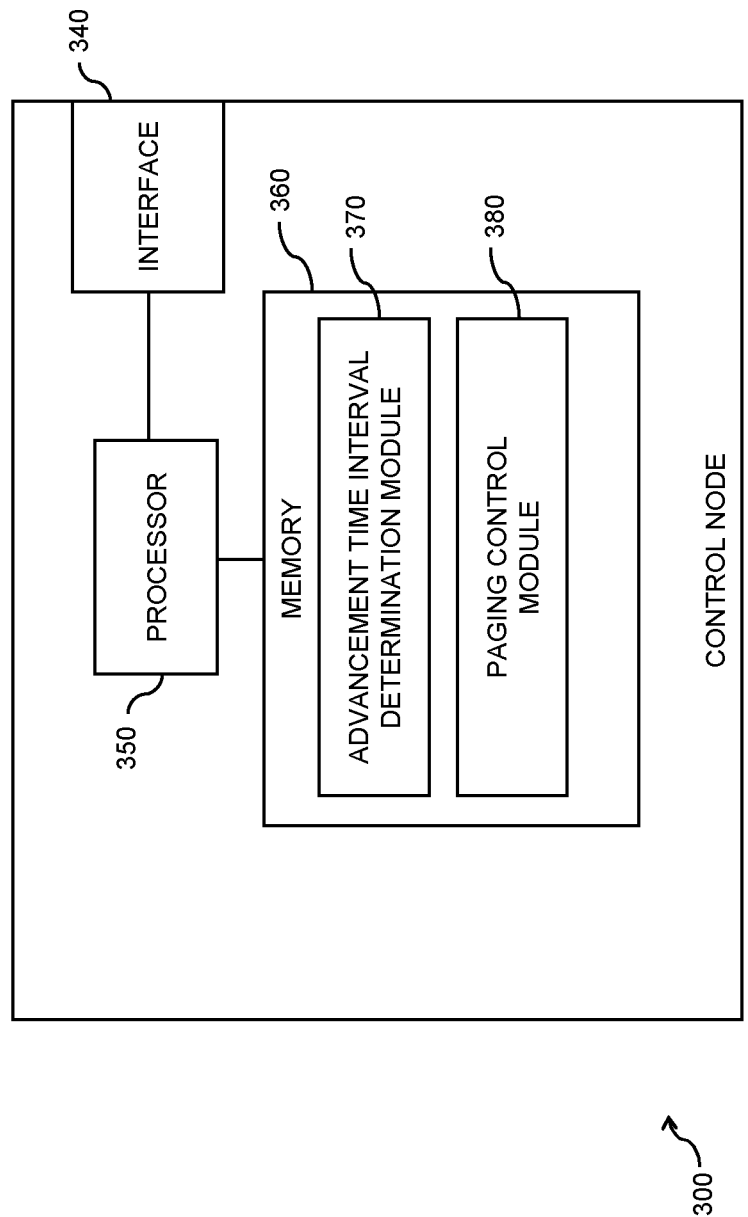
FIG. 10 schematically illustrates a control node according to an embodiment of the invention.

FIG. 10 schematically illustrates exemplary structures for implementing the above-described concepts in the control node 300.

In the illustrated structure, the control node 300 a control interface 340 for communicating with other nodes of the mobile network, e.g., the BS 100 of FIG. 1. The control interface may be used for controlling data transmission to or from the terminal device 200.

Further, the control node 300 includes a processor 350 coupled to the control interface 340 and a memory 360 coupled to the processor 350. The memory 360 may include a ROM, e.g., a flash ROM, a RAM, e.g., a DRAM or SRAM, a mass storage, e.g., a hard disk or solid state disk, or the like. The memory 360 includes suitably configured program code to be executed by the processor 350 so as to implement the above-described functionalities of the control node 300. More specifically, the memory 360 may include an advancement time interval determination module 370 for accomplishing the above-described determination of the advancement time interval. Further, the memory 360 may include a paging control module 380 for controlling the transmission of paging information to the terminal device 200, e.g., by determining and transmitting the paging configuration information to the terminal device 200 and/or by indicating the determined advancement time interval ΔA to the terminal device 200.

It is to be understood that the structure as illustrated in FIG. 10 is merely schematic and that the control node 300 may actually include further components which, for the sake of clarity, have not been illustrated, e.g., further interfaces or additional processors. For example, the control node 300 may have an interface for sending and receiving user plane data to and from the BS 100. Also, it is to be understood that the memory 360 may include further types of program code modules, which have not been illustrated. For example, the memory 360 may include program code modules for implementing typical functionalities of a control node 300, e.g., known functionalities of an MME or RNC. According to some embodiments, also a computer program product may be provided for implementing concepts according to embodiments of the invention, e.g., a computer-readable medium storing the program code and/or other data to be stored in the memory 360.

As can be seen, the concepts as explained above may be used for enabling a terminal device, e.g., an MTC terminal device or other type of UE, to retrieve paging configuration information after entering a new cell while in paging DRX sleep mode, thereby avoiding failures in receiving paging information during the upcoming active time of the paging DRX cycle. This may be particularly beneficial if case a long paging DRX cycle, e.g., with sleep periods of several minutes, hours or even longer is used. Such long paging DRX cycles are a relevant energy saving possibility for MTC terminal devices, e.g., in the form of sensor devices, but also for other types of UE. The concepts as described herein allow for addressing a larger probability of a change in the paging configuration which may have occurred during such long paging DRX cycle, e.g., due to waking up in a new cell. In this way missing of a paging occasion and an associated long delay, e.g., of another DRX sleep period, until the next paging occasion can be avoided.

It is to be understood that the examples and embodiments as explained above are merely illustrative and susceptible to various modifications. For example, the concepts could be used in types of mobile network which differ from the above-mentioned examples of an LTE mobile network or UMTS mobile network, e.g., on the basis of Wideband Code Division Multiple Access (VVCDMA). Also, the concepts may be used not only to support MTC terminal devices but also other types of UE. Further, in addition or as an alternative to the paging configuration information, also one or more other parameters may be retrieved by the terminal device when waking up from the sleep at the advance wakeup time. Depending on the character of such parameters, the above considerations for determining the advancement time interval may need to be adapted. For example, if the parameter is transmitted in a certain SIB or the MIB, the time needed to receive this SIB or the MIB may be taken into account. Further, it is to be understood that the above concepts may be implemented by using correspondingly designed software in existing mobile network nodes or terminal devices, or by using dedicated hardware of such mobile network nodes or terminal devices.

The invention claimed is:

1. A method for transmission of paging information from a mobile network to a terminal device, the method comprising:
   according to a discontinuous reception cycle, the terminal device entering a sleep mode in which the terminal device is not monitoring a downlink control channel transmitted by the mobile network;
   the terminal device determining an advance wakeup time for leaving the sleep mode, said advance wakeup time being advanced by an advancement time interval with respect to a start of an active time of the discontinuous reception cycle;
   at the determined advance wakeup time, the terminal device leaving the sleep mode and starting monitoring the downlink control channel with respect to paging configuration information from the mobile network, the paging configuration information defining a paging occasion for the transmission of the paging information; and
   on the basis of the paging configuration information, the terminal device monitoring the paging occasion to receive the paging information from the mobile network.

2. A method for transmission of paging information from a mobile network to a terminal device configured to enter, according to a discontinuous reception cycle, a sleep mode in which the terminal device is not monitoring a downlink control channel transmitted by the mobile network, the method comprising:
   the network node determining an advancement time interval defining an advance wakeup time for the terminal device leaving the sleep mode, said advance wakeup time being advanced by the advancement time interval with respect to a start of an active time of the discontinuous reception cycle; and the network node controlling the transmission of the paging information on the basis of the determined advancement time interval.

3. A terminal device, comprising:

a radio interface for data transmission between a mobile network and the terminal device;

a processor; and a memory including program code which, when executed by the processor, causes the terminal device to:

control the terminal device to enter, according to a discontinuous reception cycle, a sleep mode in which the terminal device is not monitoring a downlink control channel transmitted by the mobile network, determine an advance wakeup time for leaving the sleep mode, said advance wakeup time being advanced by an advancement time interval with respect to a start of an active time according to the discontinuous reception cycle, control the terminal device to leave the sleep mode at the determined advance wakeup time and start monitoring the downlink control channel with respect to paging configuration information from the mobile network, the paging configuration information defining a paging occasion for the transmission of the paging information, and on the basis of the paging configuration information, control the terminal device to monitor the paging occasion to receive the paging information.

4. The terminal device according to claim 3, wherein the memory further includes program code which, when executed by the processor, causes the terminal device to:

after monitoring the downlink control channel, re-enter the sleep mode; and at the start of the active time of the discontinuous reception cycle, leave the sleep mode to monitor the paging occasion.

5. The terminal device according to claim 3, wherein the memory further includes program code which, when executed by the processor, causes the terminal device to:

maintain historical data relating to past changes of the paging configuration information; and determine the advancement time interval on the basis of the historical data.

6. The terminal device according to claim 3, wherein the memory further includes program code which, when executed by the processor, causes the terminal device to:

determine the advancement time interval on the basis of a length of a sleep period between entering the sleep mode and the start of the active time of the discontinuous reception cycle.

7. The terminal device according to claim 3, wherein the memory further includes program code which, when executed by the processor, causes the terminal device to:

determine at least one probability value; and determine the advancement time interval on the basis of the at least one determined probability value.

8. The terminal device according to claim 7, wherein the at least one probability value represents a probability of the paging configuration information having changed while the terminal device was in the sleep mode.

9. The terminal device according to claim 7, wherein the at least one probability value represents a probability of the terminal device having moved to another cell of the mobile network while the terminal device was in the sleep mode.

10. The terminal device according to claim 7, wherein the at least one probability value represents a probability of the terminal device failing to monitor the paging occasion.

11. The terminal device according to claim 7, wherein the terminal device receives the at least one probability value from the mobile network.

12. The terminal device according to claim 3, wherein the memory further includes program code which, when executed by the processor, causes the terminal device to:

determine the advancement time interval on the basis of a number of reception steps required by the terminal device to receive the paging configuration information.

13. The terminal device according to claim 3, wherein the memory further includes program code which, when executed by the processor, causes the terminal device to:

indicate the advancement time interval to the mobile network.

14. The terminal device according to claim 3, wherein the memory further includes program code which, when executed by the processor, causes the terminal device to:

receive an indication of the advancement time interval from mobile network.

15. The terminal device according to claim 3, wherein the memory further includes program code which, when executed by the processor, causes the terminal device to:

receive the paging information before the start of the active period of the discontinuous reception cycle.

16. The terminal device according to claim 3, wherein the memory further includes program code which, when executed by the processor, causes the terminal device to:

detect a failure in monitoring the paging occasion; and indicate the failure to the mobile network.

17. A network node, comprising:

an interface for controlling data transmission between a mobile network and a terminal device configured to enter, according to a discontinuous reception cycle, a sleep mode in which the terminal device is not monitoring a downlink control channel transmitted by the mobile network;

a processor; and a memory including program code which, when executed by the processor, causes the network node to:

determine an advancement time interval defining an advance wakeup time for the terminal device leaving the sleep mode, said advance wakeup time being advanced by the advancement time interval with respect to a start of an active time of the discontinuous reception cycle; and control the transmission of the paging information on the basis of the determined advancement time interval.

18. The network node according to claim 17, wherein the memory further includes program code which, when executed by the processor, causes the network node to:

maintain historical data relating to past changes of the paging configuration information; and determine the advancement time interval on the basis of the historical data.

19. The network node according to claim 17, wherein the memory further includes program code which, when executed by the processor, causes the network node to:

determine the advancement time interval on the basis of a length of a sleep period between entering the sleep mode and start of the active time of the discontinuous reception cycle.

20. The network node according to claim 17, wherein the memory further includes program code which, when executed by the processor, causes the network node to:
  determine at least one probability value; and
  determine the advancement time interval on the basis of the at least one determined probability value.

21. The network node according to claim 20, wherein the at least one probability value represents a probability of the paging configuration information having changed while the terminal device was in the sleep mode.

22. The network node according to claim 20, wherein the at least one probability value represents a probability of the terminal device having moved to another cell of the mobile network while the terminal device was in the sleep mode.

23. The network node according to claim 20, wherein the at least one probability value represents a probability of the terminal device failing to monitor the paging occasion.

24. The network node according to claim 17, wherein the memory further includes program code which, when executed by the processor, causes the network node to:
  determine the advancement time interval on the basis of a number of reception steps required by the terminal device to retrieve the paging configuration information.

25. The network node according to claim 17, wherein the memory further includes program code which, when executed by the processor, causes the network node to:
  indicate the advancement time interval to the terminal device.

26. The network node according to claim 17, wherein the memory further includes program code which, when executed by the processor, causes the network node to:
  indicate the at least one probability value to the terminal device.

27. The network node according to claim 17, wherein the memory further includes program code which, when executed by the processor, causes the network node to:
  receive an indication of the advancement time interval from the terminal device; and
  determine the advance wakeup time on the basis of the received indication of the advancement time interval.

28. The network node according to claim 17, wherein the memory further includes program code which, when executed by the processor, causes the network node to:
  determine paging configuration information defining a paging occasion for sending the paging information to the terminal device; and
  after the advance wakeup time and before the start of the active time of the discontinuous reception cycle, send the paging configuration information to the terminal device.

29. The network node according to claim 17, wherein the memory further includes program code which, when executed by the processor, causes the network node to:
  after the advance wakeup time and before the start of the active time of the discontinuous reception cycle, send the paging information to the terminal device.

30. The network node according to claim 17, wherein the memory further includes program code which, when executed by the processor, causes the network node to:
  receive, from the terminal device, an indication of a failure in monitoring the paging occasion by the terminal device; and
  if paging information was sent at the paging occasion, send a retransmission of the paging information.

* * * * *